United States Patent [19]

Guigan

[11] 4,423,827

[45] Jan. 3, 1984

[54] AUTOMATIC RESETTING APPARATUS FOR STORING AND DISPENSING OBJECTS

[76] Inventor: Jean Guigan, 9, rue Jean Mermoz, 75008 Paris, France

[21] Appl. No.: 252,988

[22] Filed: Apr. 10, 1981

[30] Foreign Application Priority Data

Apr. 10, 1980 [FR] France .................... 80 08041

[51] Int. Cl.³ .................................... B65G 59/06
[52] U.S. Cl. .................................... 221/129; 221/131; 221/298
[58] Field of Search ............ 221/126, 129, 131, 133, 221/298

[56] References Cited

U.S. PATENT DOCUMENTS

| | | | |
|---|---|---|---|
| 3,138,288 | 6/1964 | Ine et al. | 221/298 X |
| 3,819,087 | 6/1974 | Schuller et al. | 221/133 |
| 3,819,088 | 6/1974 | Guigan | 221/224 |
| 3,893,589 | 7/1975 | Mandell . | |
| 4,000,821 | 1/1977 | Elecompack . | |

FOREIGN PATENT DOCUMENTS 2326591 12/1974 Fed. Rep. of Germany .
2175958 10/1975 France .
1000605 8/1965 United Kingdom .............. 221/129

Primary Examiner—F. J. Bartuska
Attorney, Agent, or Firm—Sughrue, Mion, Zinn, Macpeak and Seas

[57] ABSTRACT

Apparatus for automatically storing and dispensing objects. This apparatus includes vertical storage pigeon-holes (7) contained in horizontal racks in drawers (3). Each pigeon-hole is filled with a stack (30) of objects and has an object extractor mechanism at its base, said mechanism being provided with a trap-door (31) and with a mechanism which jams the last but one object of the stack before and during the opening of the trap-door (31). A moving carriage (23) in a passage which is below the pigeon-holes of a rack allows the object extractor mechanisms to be actuated and the objects extracted from the pigeon-holes to be pushed towards the front of the drawer (3).

30 Claims, 33 Drawing Figures

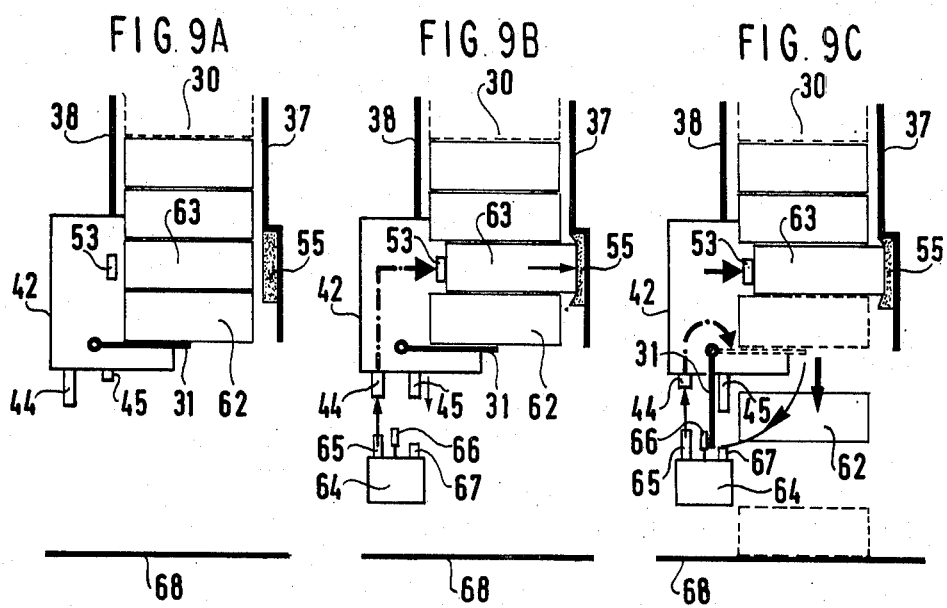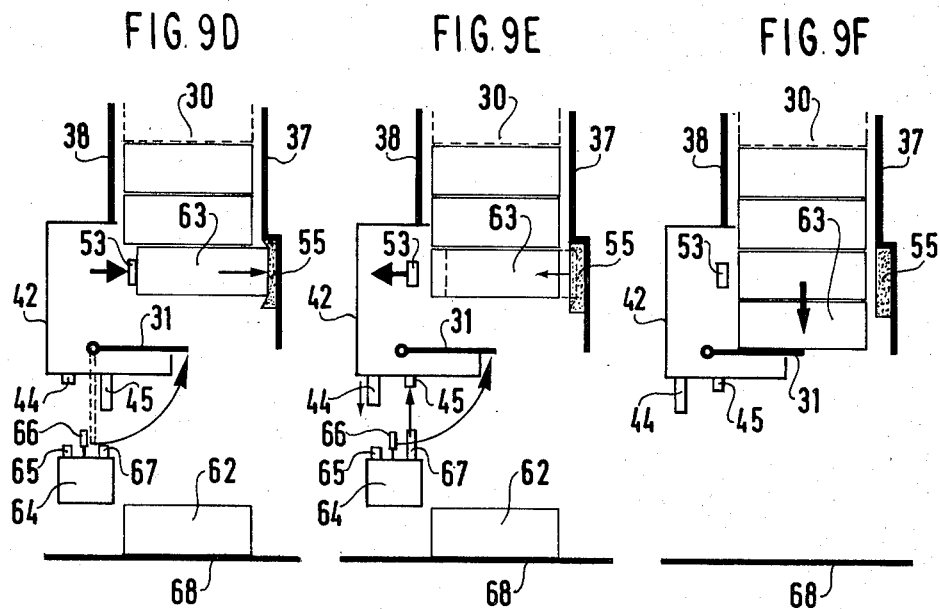

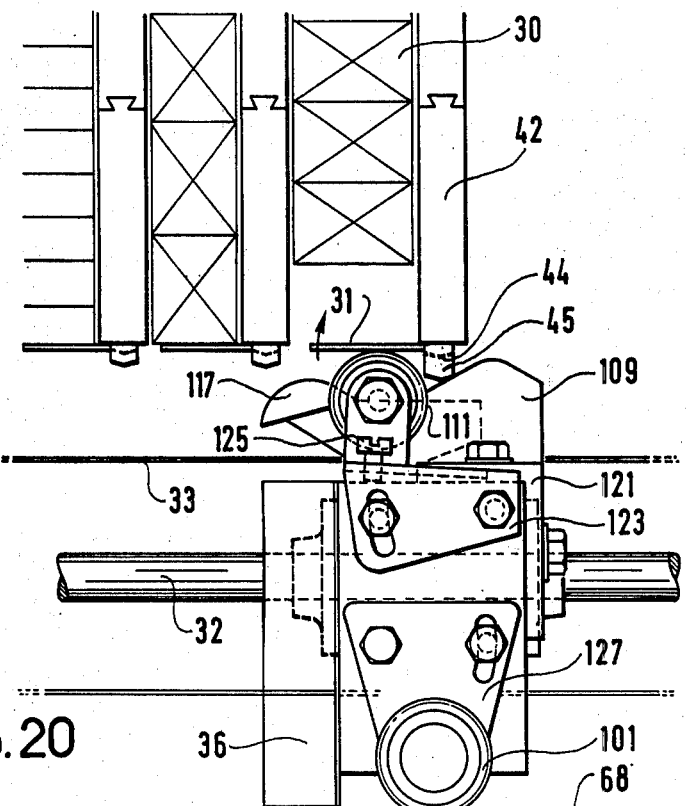
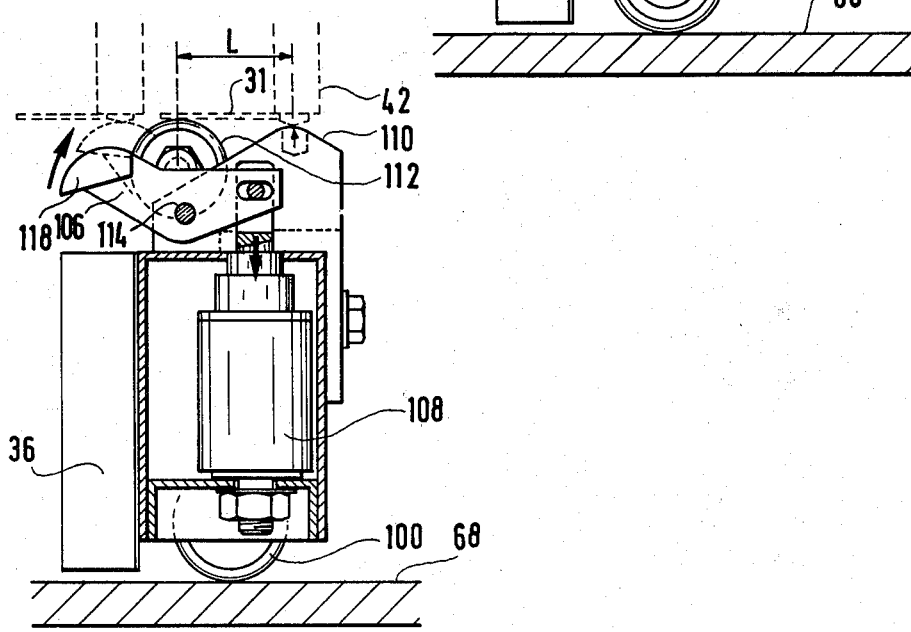
FIG. 19
FIG. 20

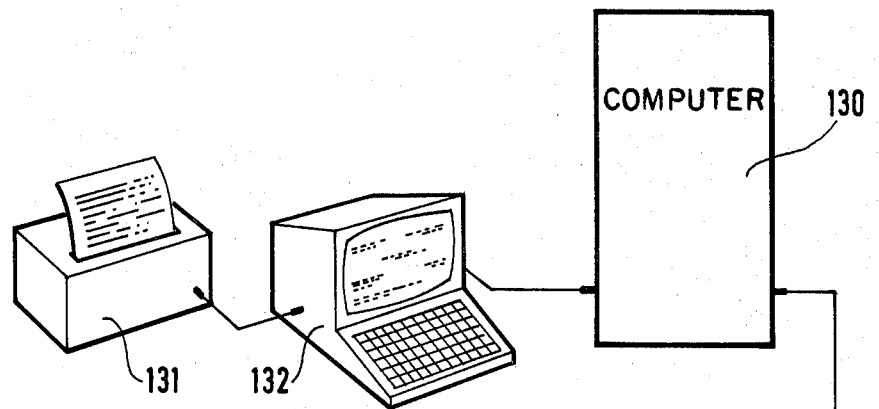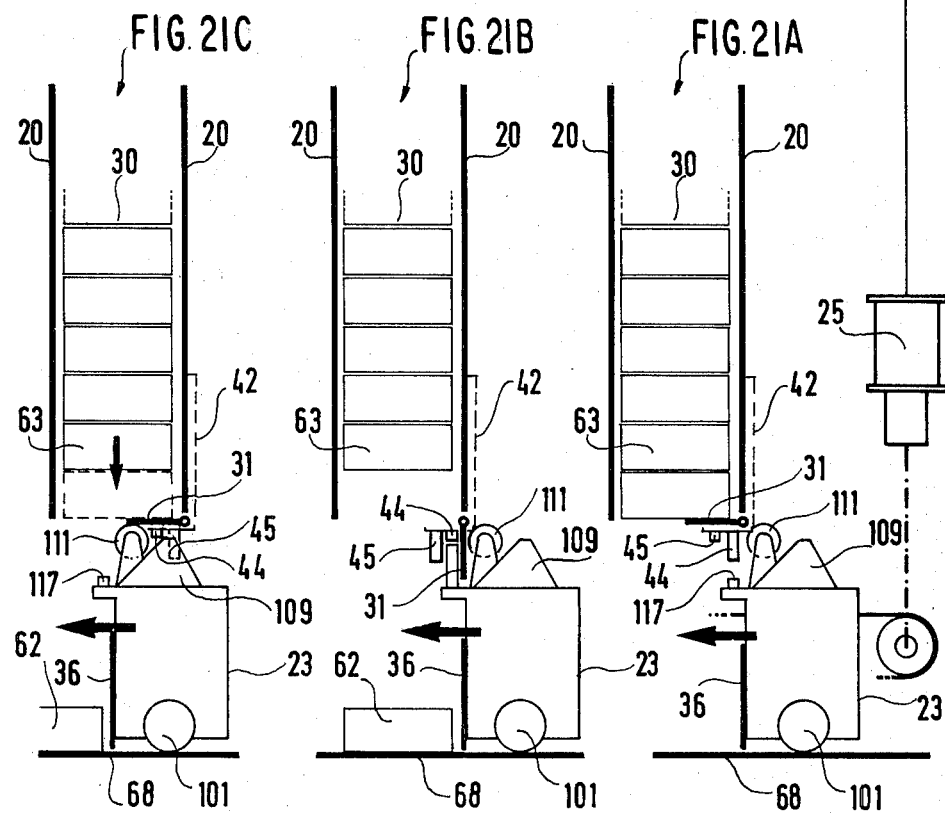

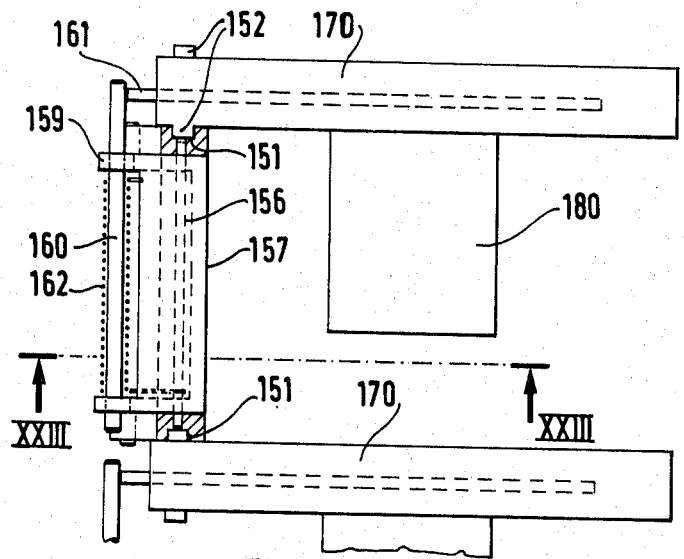
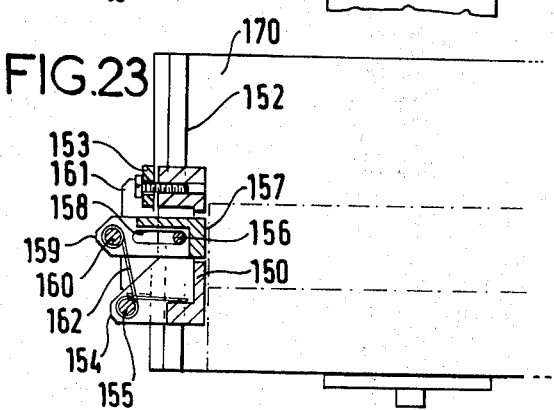
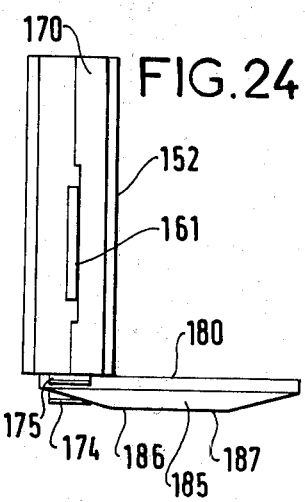
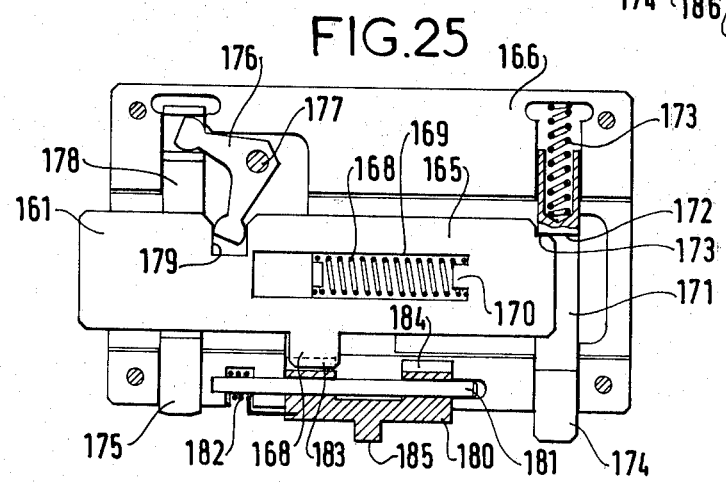

AUTOMATIC RESETTING APPARATUS FOR STORING AND DISPENSING OBJECTS

The present invention relates to storing and dispensing objects such as, for example, boxes of medicine.

BACKGROUND

Storing and dispensing objects of very different kinds and sizes such as pharmaceutical products leads to problems of inventory control and handling. To solve these problems, storage and dispensing cabinets which are entirely automatically computer-controlled have already been thought of. In particular, U.S. Pat. No. 3,819,088 issued to Applicant describes an automatic storage and dispensing cabinet which includes: a set of sliding drawers divided into pigeon-holes in which the objects are stacked in categories; an extractor mechanism for extracting an object from the base of a stack in a pigeon-hole, said extractor mechanism being placed in front of the cabinet but out of reach of the drawers in the closed position; and motors which cause the drawers to be opened to put their pigeon-holes within reach of the extractor mechanism. An object is extracted from the cabinet automatically, directed by the computer which selects the pigeon-hole that contains the required object and controls the movement of the drawer which contains it to bring it within reach of the extractor means. Such a dispensing cabinet operates perfectly, but has the disadvantage of requiring each drawer to be powered, which leads to a relatively high cost price.

Preferred embodiments of the present invention provide apparatus of lower cost price which allows a large number of objects of very various categories to be stored, automatically dispensed and easily restocked.

SUMMARY OF THE INVENTION

The present invention provides apparatus for automatically and dispensing objects, said apparatus comprising:
vertical pigeon-holes for storing stacks of objects, and pigeon-holes being disposed in at least one horizontal row herein referred to as a rack;
one ejector mechanism per pigeon-hole, said ejector mechanism being housed in a flat body or casing which fits vertically into a cut-out portion at the lower part of a side wall of the pigeon-hole in question and operating a trap-door designed to close the bottom of the pigeon-hole and to support the stack of objects contained in the pigeon-hole, and a clamping shoe which allows the last but one object of the stack to be jammed against a side wall of the pigeon-hole during the opening of the trap-door;
one moving carriage per rack of pigeon-holes which carriage moves along the rack in question;
guide and drive means for each moving carriage;
first means for actuating the ejector mechanisms which are integral therewith, said first means for actuating the ejector mechanisms of the pigeon-holes of a rack which are accessible from the moving carriage moving parallel to this rack;
second means for actuating the ejector means which are integral with each moving carriage, said second means co-operating with said first means for actuating the ejector mechanisms of the pigeon-holes of the rack along which the moving carriage in question moves;
means for checking and controlling the movements of each moving carriage;
control means for controlling the second actuating means which are integral with each moving carriage; and
means for collecting the objects extracted from the pigeon-holes.

Objects are automatically extracted from the apparatus in accordance with the invention without moving the pigeon-holes which therefore do not need to be powered. This is done by means of a moving carriage which moves to release the ejector mechanism of a pigeon-hole which contains a stack of objects of the required category and to cock this ejector mechanism again once the object is extracted from the pigeon-hole.

The apparatus in accordance with the invention may also have at least one of the following features:

The pigeon-holes are contained in groups of two parallel alignments or racks of substantially equal length. The two racks of a group are separated by a passage in which both of the moving carriages move. The carriages serve the racks and are joined together to form a single moving part.

The means for collecting the objects extracted from the pigeon-holes of a rack includes a push plate which is fixed to the moving carriage which serves the rack and which moves along the passage which is immediately under the pigeon-holes during the movements of the moving carriage.

The passage which is under the pigeon-holes of a rack and is left free for the objects ejected from the pigeon-holes to pass therethrough communicates at one end of the rack with a trough placed outside the apparatus. The carriage which serves the rack pushes a push plate in the direction of the trough and can cause an object to be ejected only from a pigeon-hole situated beyond the push plate.

BRIEF DESCRIPTION OF THE DRAWINGS

Other characteristics and advantages of the invention become apparent from the appended claims and from the description of an embodiment given by way of example. This description is given hereinafter with reference to the drawings in which:

FIGS. 9A–9F are a succession of diagrams of the various steps in the operation of the mechanism for extracting objects from a pigeon-hole of the rack illustrated in FIG. 4;

FIG. 19 is an elevation of the moving carriage illustrated in FIG. 18;

FIG. 20 is a cross-section in elevation of the moving carriage shown in FIGS. 18 and 19;

FIGS. 21A–21C are a succession of diagrams showing the various steps in operation of the control circuits of the moving carriage illustrated in FIG. 18 as well as the various positions assumed by this same carriage to actuate and cock the mechanism for extracting a box from a pigeon-hole.

FIG. 22 is a partially cutaway plan view of a variant of the clamping shoe and of its guide part seen from above;

FIG. 23 is a transversal cross-section along line XXIII—XXIII of FIG. 22;

FIG. 24 is an elevation of a variant of a casing which contains an object extractor mechanism;

FIG. 25 is a front view of the variant of a casing illustrated in FIG. 24 with one of the half casings removed and the mechanism in the rest position.

DESCRIPTION OF PREFERRED EMBODIMENTS

Figure 1:
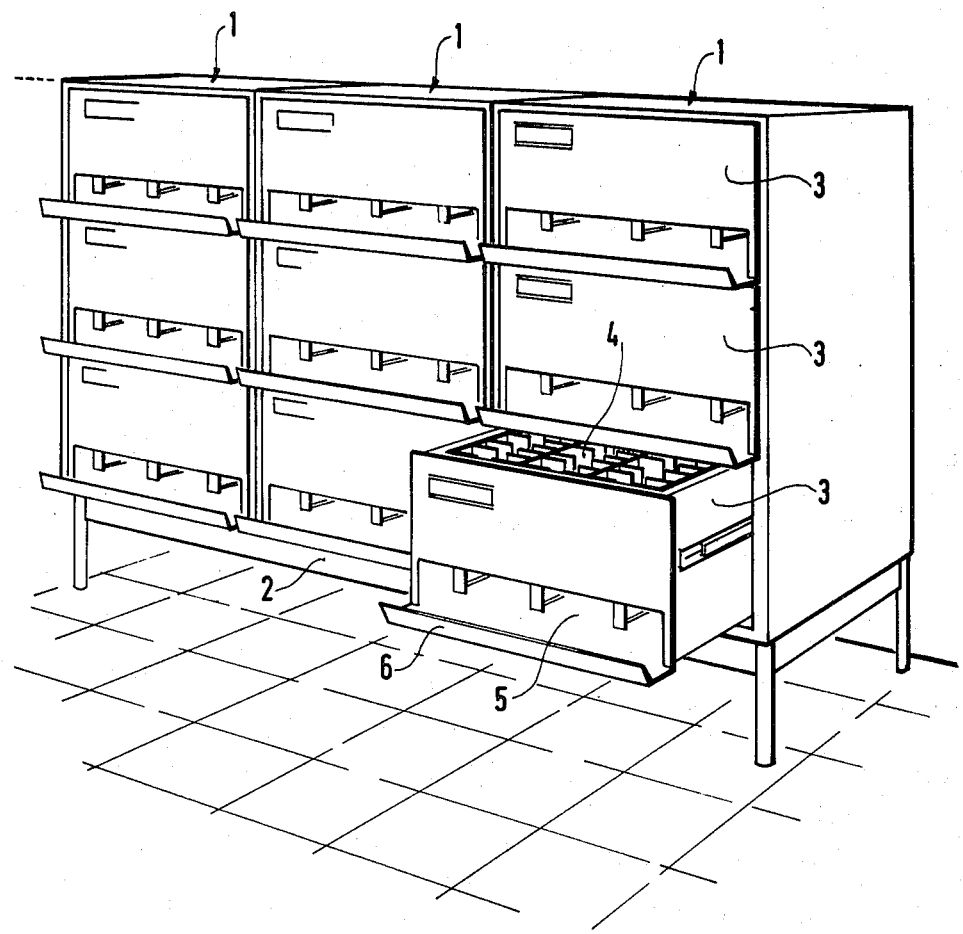
FIG. 1 is a perspective view of a cabinet which forms a part of the apparatus in accordance with the invention and contains a stock of objects as well as a dispensing mechanism.

The apparatus which is described hereinafter is designed to automatically store and dispense boxes of medicine in a pharmacy. FIG. 1 illustrates a cabinet which forms a part of this apparatus and contains the stock of medicine as well as the box dispensing mechanism. This cabinet is of modular design. It is formed by three containers 1 placed side by side on a mounting 2. Each container has three identical superposed drawers 3. A drawer 3 constitutes a minimum module. Its upper portion contains a set 4 of vertical pigeon-holes in which boxes of medicine are stacked by category and its lower portion contains release passages 5 which are situated beneath the pigeon-holes and which communicate with the lower edge of the front surface of the drawer. The lower portion also contains a dispensing mechanism capable of extracting a box from any one of the pigeon-holes into the release passages 5 and thence to the outside of the drawer. The openings of the release passages 5 on the front surface of the drawer 3 communicate with a front trough 6 where the boxes of medicine ejected from the pigeon-holes are delivered. The drawers 3 slide on slide rails and open sufficiently to clear the tops of the pigeon-holes and allow them to be loaded with boxes of medicine.

Figure 2:
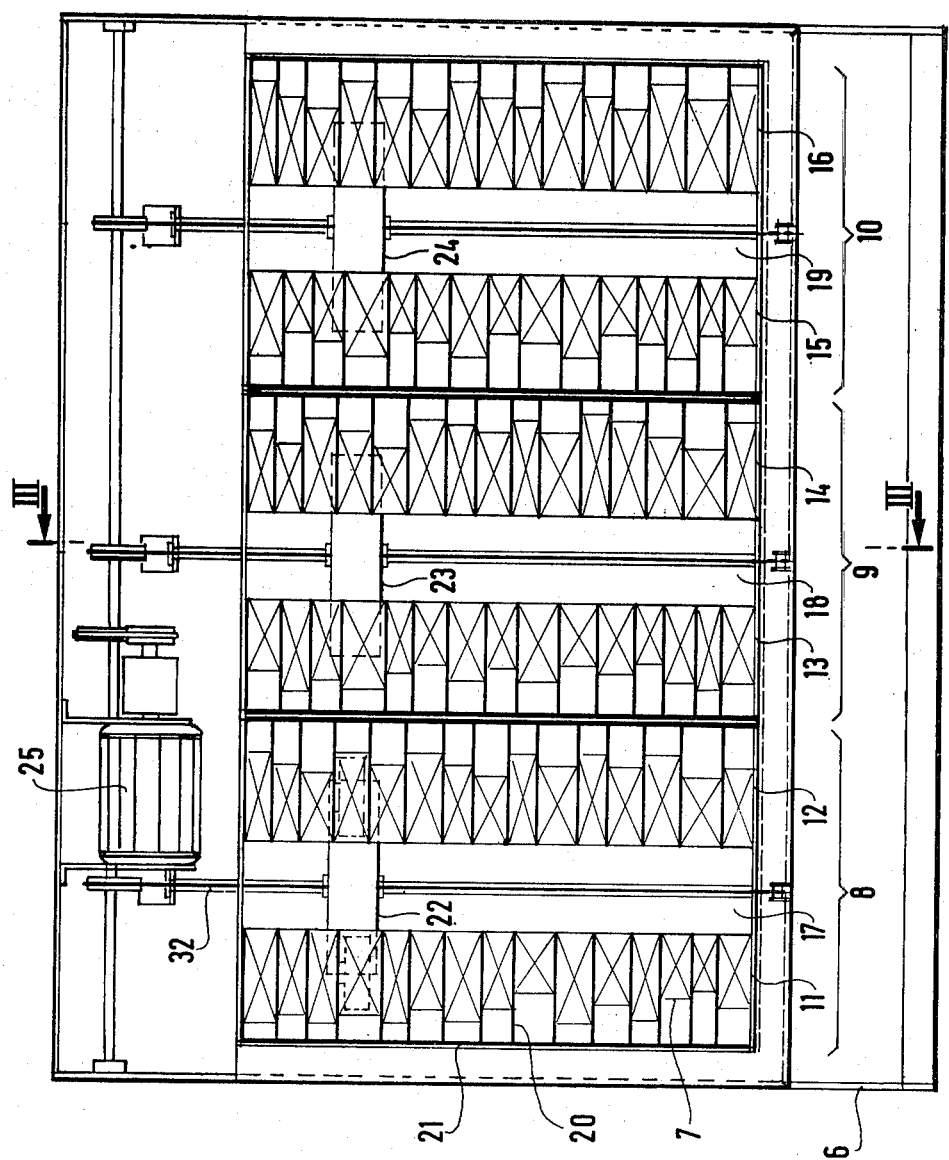
FIG. 2 is a plan view, seen from above, of a drawer of the cabinet of FIG. 1.

FIG. 2 illustrates a drawer 3 seen from above and shows how the set 4 of vertical pigeon-holes is disposed. The pigeon-holes 7 are of rectangular cross-section and they are grouped into three identical groups 8, 9, 10. In each group they are disposed on respective pairs of horizontal racks 11 and 12, 13 and 14, 15 and 16, and the pairs are separated by corresponding passages 17, 18, 19. The pigeon-holes 7 of a rack are constituted by vertical partitions 20 fixed at adjustable spacing edge on to a vertical support plate 21 disposed parallel to the length of a drawer. At the base of each pigeon-hole 7 there is an ejector mechanism which has access to the passage adjacent to the pigeon-hole and which serves to extract the lowest box from the stack contained in the pigeon-hole. Two-part moving carriages 22, 23 and 24 move in the respective passages 17, 18 and 19 and serve simultaneously to actuate the ejector mechanisms of the two racks of pigeon-holes on either side of the passage and to bring out into the trough 6 the boxes ejected from the pigeon-holes, into the release passage located there beneath. The moving carriages 22, 23, 24 are guided by rails 32 in their respective passages 17, 18 and 19 and are driven in synchronism by a single motor 25 using a mechanical transmission based on cables and pulleys.

Figure 3:
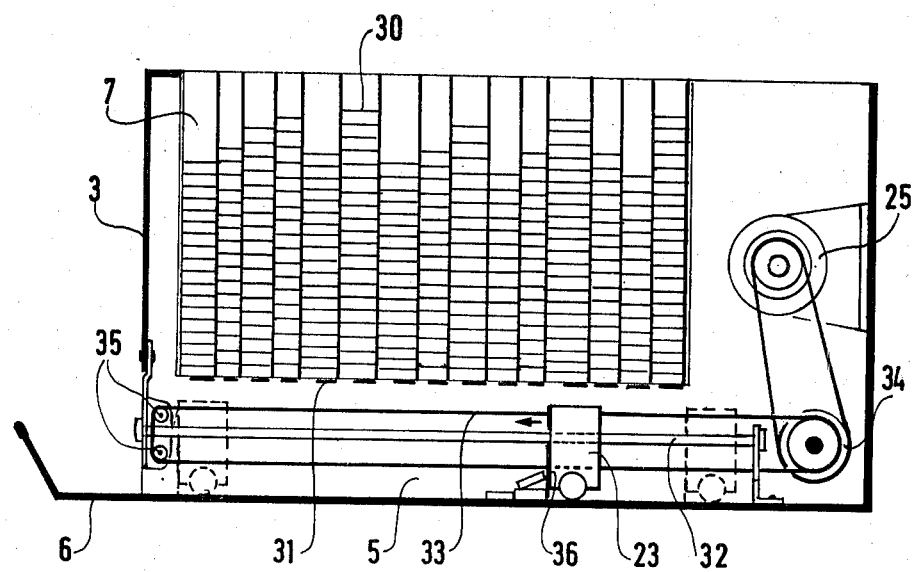
FIG. 3 is a vertical cross-section of a drawer of the cabinet of FIG. 2 taken about line III—III.

FIG. 3 is a vertical cross-section of a drawer along line III—III of FIG. 2. This figure shows clearly the pigeon-holes 7 of a rack 13 placed above a release passage 5 which, at the front of the drawer 3, communicates with the trough 6. These pigeon-holes contain stacks of boxes 30 and have moving bottoms constituted by trap doors 31 hinged to the rear walls of the pigeon-holes. The moving carriage 23 slides under the pigeon-holes on a guide rail 32 and is drawn along by a cable 33 mounted as a drive belt between a drive pulley 34 and driven pulleys 35 placed at both ends of its passage. A push plate 36 moves along the release passage which is underneath the pigeon-holes. It is arranged that the plate 36 is always located behind the boxes to be pushed out into the trough 6, i.e. between the back of the drawer and the pigeon-hole whose ejector mechanism is ready to extract a box from the stack.

Figure 4:
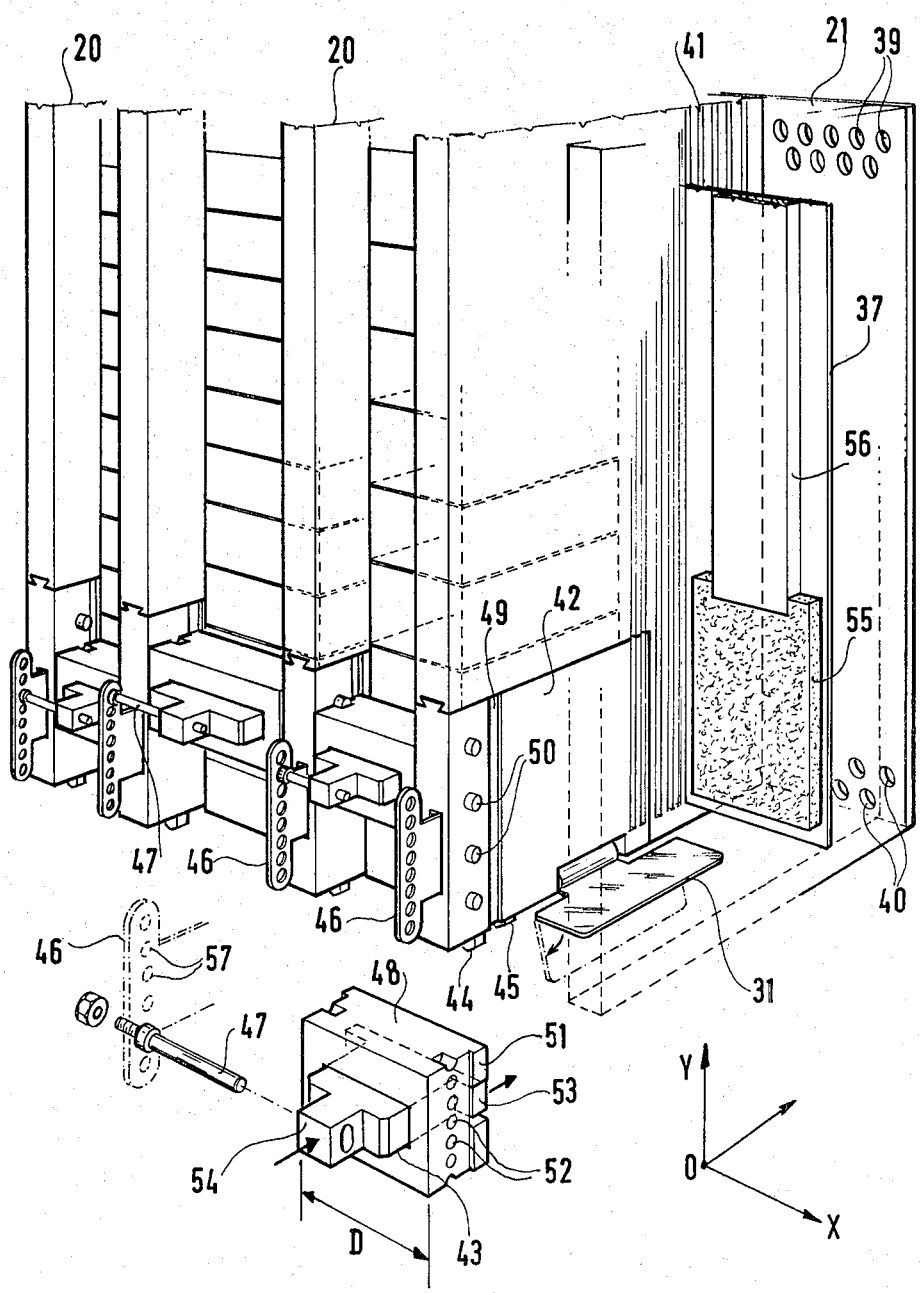
FIG. 4 is a view in perspective of a rack of pigeon-holes of a drawer of a portion of the cabinet of FIG. 1.

FIG. 4 is a perspective view of a rack of pigeon-holes (such as 12, FIG. 2) seen from the passage which serves it (22 in the example in question). An orientation trihedron defines a vertical direction OY and a horizontal direction OX towards the front of the drawer. This figure shows the vertical partitions 20 which are fixed, edge on, onto the vertical support plate 21 and form the framework of the pigeon-holes. The vertical partitions 20 are all identical. The bottom corner nearest to the passage of each partition 20 has a large rectangular portion cut out to house a flat body or casing 42. Said body or casing has the same dimensions as the cut out portion and the same thickness as the partition and itself houses an ejector mechanism.

The vertical pigeon-holes of rectangular cross-section have only three vertical walls—a front wall constituted by the facing sides of two adjacent partitions 20 and a side wall which separates them from the vertical support plate 21 and which is constituted by a strip 37 which is fixed between two adjacent vertical partitions 20. The fourth vertical walls of the pigeon holes, namely those which separate them from the adjacent passage are constituted by pairs of flaps made of indiarubber strip and disposed vertically along the edges of the partitions 20 and extending towards each other. They are not illustrated so as not to over-complicate the figure. The indiarubber strips guide the corners of the boxes and ensure that the boxes are properly positioned in the ejector mechanisms situated at the bases of the pigeon-holes. The pigeon-holes all have the same height and their width and length are adjustable to the dimensions of the boxes which are to be inserted in them. Their width is adjusted by varying the spacing between the partitions 20 and their length is adjusted by varying the spacing between the strips 37 and the support plates 21.

The partitions 20 and the support plates 21 constitute the frame work of the pigeon-holes of a rack. The partitions 20 are assembled on the support plates 21 by means of a system of studs which are sandwiched between facing openings formed in the edges of the partitions 20 and in the support plate 21. The openings formed in the support plate 21 are uniformly spaced apart in two staggered groups of horizontal rows one of which, 39, is disposed near the top of the plate 21 and the other of which 40, is disposed near the bottom of the plate 21. The openings formed in the edge of a partition 20 are arranged in a vertical row at heights which correspond to the heights of the rows of holes formed in the support plate 21. This assembly system makes it possible to choose between a multitude of discreet positions for each partition 20. These positions are very close to one another and give great freedom for adjusting the spacing between partitions 20. These partitions of each rack are held against the support plate 21 by means of a holding strip, not illustrated, passing over the fronts of the partitions, level with the upper edges of the ejector mechanism casings 42. The holding strip is fixed by its ends to the support plate 21 by means of suitable tightening means, e.g. bolts and wingnuts.

The system for assembling the strips 37 between the sides of two adjacent partitions 20 is constituted by a grid 41 of vertical grooves cut in the sides of each partition 20 in the neighbourhood of the support plate 21. The lower ends of these grooves are closed and their upper ends are left open. The strips 37 are of different widths corresponding to the possible widths for the pigeon-holes and are sandwiched between two adjacent partitions 20 in two facing grooves.

A box at the base of a stack is extracted from a pigeon-hole by means of an ejector mechanism proper to the pigeon-hole in question. The ejector mechanism is provided with a bottom trap-door 31, and with clamping shoes 43 for trapping the next to bottom box of the stack before and during the opening of the trap-door. The clamping shoe and trap-door actuating members are housed in the casing 42 which is fixed at the bottom of the partition which constitutes the back wall of the casing 42.

Spaced out along the bottom end surface of each casing 42, between the support plate 21 and the passage, there are a trap-door 31, a button 45 for cocking the ejector mechanism and another button 44 for releasing it. The trap-door is hinged to open towards the front of the drawer. The head 46 of a first horizontally-slideable trigger projects into the passage from the side edge of each casing 42. A rod 47 is bolted at right-angles onto the trigger 46, and serves to move the clamping shoe 43 horizontally in a guide part 48 which forms a distance piece between the casing 42 in question and the next casing in the direction of the front of the drawer.

Each guide part 48 is placed between a pair of adjacent casings 42 on the passage side of the base of the corresponding pigeon-hole, level with the second box from the bottom of the stack contained in the pigeon-hole. The guide parts are located below the afore-mentioned indiarubber strips. Each guide part 48 is in the form of a block provided with a horizontal opening of rectangular cross-section in which its clamping shoe 43 slides. The guide parts may be of various widths D as a function of the possible widths of the pigeon-holes. They are fitted between the sides of the casings 42. The facing surfaces of the casings 42 and of and the guide parts 48 interlock in a pattern which is repeated vertically to allow the height of the guide parts to be adjusted in small increments. These interlocking surfaces are formed firstly by vertical grooves 49 in the casings 42 with corresponding flanges 51 on the guide parts, and secondly by sets of four horizontally projecting round studs 50 spaced uniformly in vertical lines up the casings 42 with corresponding circular holes 52 of the same diameter as the studs 50 in the guide parts 48. The holes 52 are spaced out along vertical lines at one third of the spacing pitch of said studs 50. The vertical grooves 49 co-operate with the vertical flanges 51 to properly orientate the guide pieces 48 and to make the travel of the clamping shoe 43 horizontal. The holes 52 co-operate with the studs 50 to fix the height of the guide pieces 48 relative to the casings 42.

Each clamping shoe 43 has a head 53 of rectangular cross-section of the same width as and thinner than a guide piece 48. The head 53 faces towards the inside of the pigeon-hole. It can be retracted out of the pigeon-hole and enter the guide part 48 completely or, on the contrary, it can be made to project into the pigeon-hole in the direction of the side wall 37. The head 43 extends through the guide part 48 in the form of a narrower body of rectangular cross-section which ends in a tenon 54 having a hole at 90° to it in which hole the rod 47 fits loosely.

The head 46 of the first trigger has a vertically disposed series of holes 57 accommodate rods 47 fixed at various heights depending on the height of the clamping shoe 43.

The surface of the side wall 37 of the pigeon-hole adjacent the clamping shoe 43 is lined with a resilient lining 55 which makes it resiliently deformable under the action of a box pushed by the clamping shoe. This resilient lining 55 is either fitted into the wall 37 which then has a horizontal recessed portion into which the lining is fitted, or, as illustrated, glued in relief onto the wall and topped by a guide 56 which prevents the boxes from being jammed on its upper rim.

Figure 5:
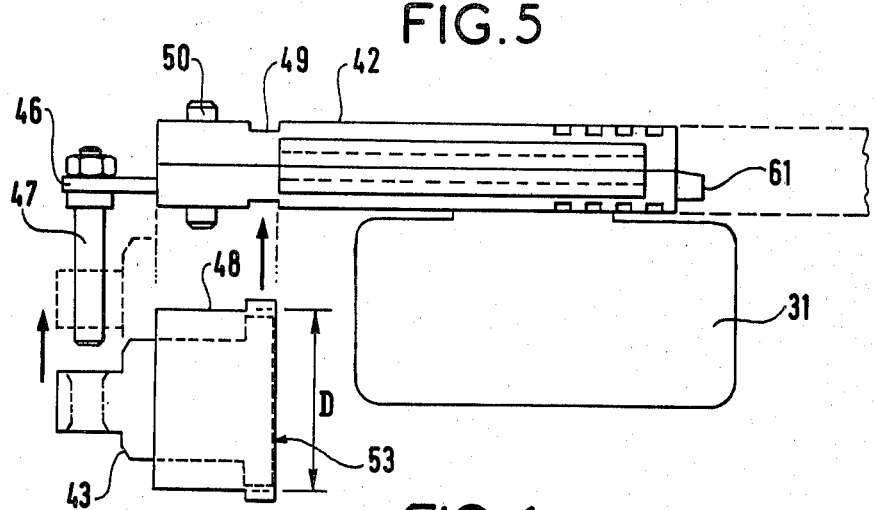
FIG. 5 is a plan view, seen from above, of a trap-door, together with a clamping shoe and a casing of an object extractor mechanism which equips each pigeon-hole of the rack illustrated in FIG. 4.

The way in which a clamping shoe 43 and its guide 48 can be removed is more clearly seen in FIG. 5 which is a top view of a casing 42, showing the clamping shoe 43 which it actuates and its guide part 48 partially removed.

Figure 6:
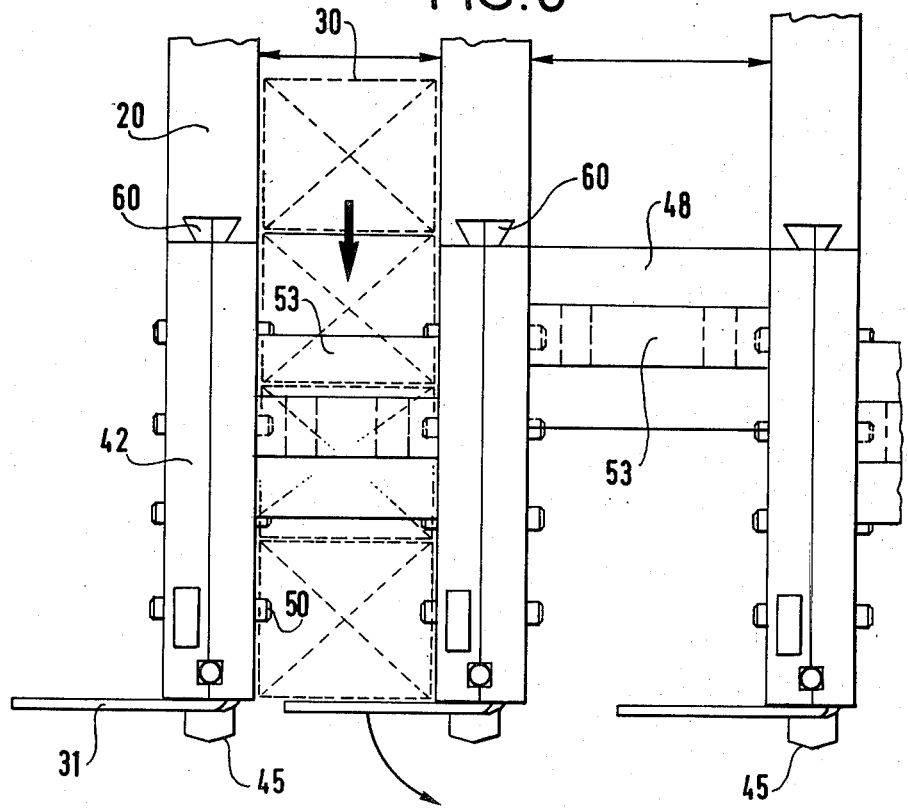
FIG. 6 is a partial schematic view of the clamping shoes and their assembly parts of the rack illustrated in FIG. 4 as seen from the inside of two consecutive pigeon-holes.

FIG. 6 is a diagrammatic illustration of the clamping shoe heads 53 and their associated guide parts 48 for two consecutive pigeon-holes as seen from the inside of the pigeon-holes. It shows how the clamping shoe heads 53 and their guide parts 48 can be matched to pigeon-holes of different widths and at different heights.

FIGS. 5 and 6 also show how the casings 42 are fixed onto the partitions 20 by a dovetail 60 and mitre 61 joint system.

Figure 7:
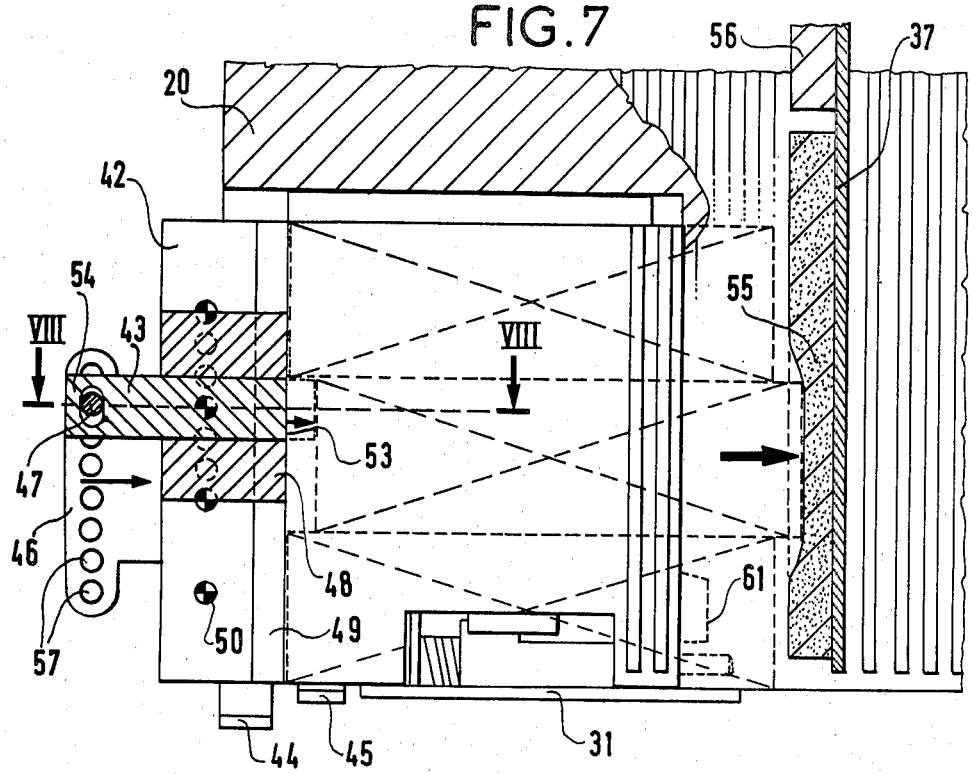
FIG. 7 is a vertical cross section through the base of a pigeon-hole, which shows the locking effect of the clamping shoe on the last but one box of the stack in the pigeon-hole of the rack illustrated in FIG. 4.
Figure 8:
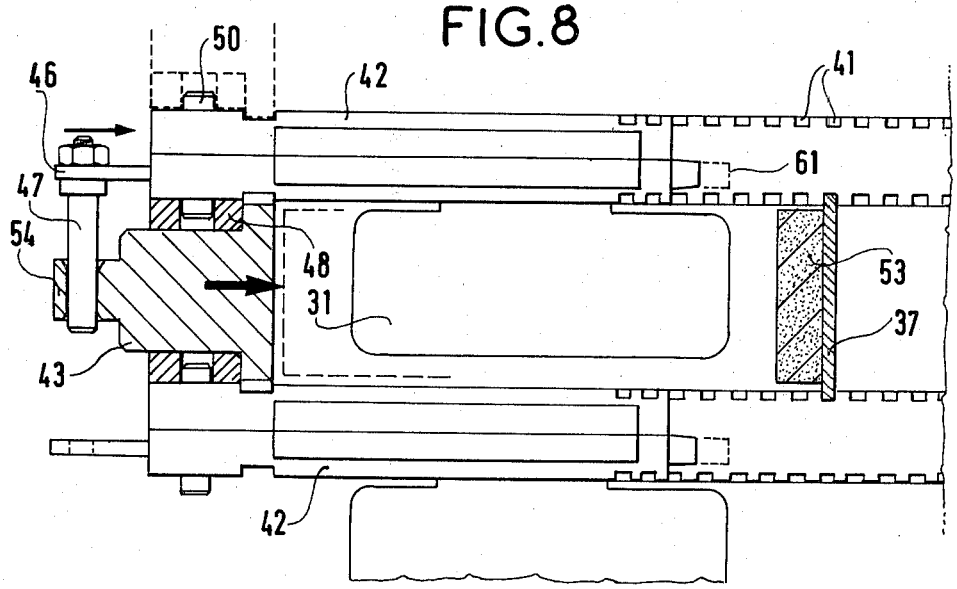
FIG. 8 is a horizontal cross-section along line VIII—VIII of FIG. 7.

FIG. 7 illustrates the base of a pigeon-hole in a vertical cross-section perpendicular to the support plate 21. It shows the locking effect on the second box of the stack by means of the clamping shoe. It also shows in detail the interlocking of the guide part 48 against the side of the casing 42 as well as the loose fixing of the rod 47 in the tenon 54 of the clamping shoe 43. The hole in which the rod 47 is fitted is a vertically extending oval to provide finer adjustment for height than that provided by a set of holes 57 provided in the trigger head 46. FIG. 8 which is a cross-section view along line VIII—VIII of FIG. 7 shows how the guide part 48 interfits between the adjacent sides of two casings 42, and how the strip 37 which forms the side wall of the pigeon-hole is fitted between the sides of the partitions 20 which support the casings 42.

FIGS. 9A–9F illustrate very schematically the succession of movements of the trap-door 31 and of a clamping shoe head 53 of the ejector mechanism of a pigeon-hole during extraction of the box situated at the base of the stack contained in the pigeon-hole. The various figures show:
- a pigeon-hole in cross-section, with its side wall 37 and india rubber guide strips 38;
- a stack 30 of boxes disposed in the pigeon-hole with the lower boxes referenced 62 and 63;
- the resilient lining 55 glued to the base of the side wall 37 and the clamping shoe head 53 level with the resilient lining 55 but on the other side of the stack 30;
- the trap-door disposed under the stack 30 and shown hinged in a direction other than that in which it really lies so as to make the figure easier to understand;
- the casing 42 which contains the actuating parts of the trap-door 31 and of the clamping shoe with its release push-button 44 and its cocking push-button 45;
- the moving carriage which serves the pigeon-hole illustrated very schematically by a rectangle 64 topped by three fingers 65, 66 and 67 which act respectively as means for operating the release push-button 44, the trap-door 31 and the cocking push-button 45; and
- a bottom plate 68 which leads to the front face of the drawer; again the directions in this schematic illustration have been turned round so as to make the figure easier to understand.

In FIG. 9A the casing 42 is in the rest position with the trap-door 31 closed. The clamping shoe head 53 is retracted out of the pigeon-hole, the release push-button 44 is extended and the cocking push-button is pushed in.

In FIG. 9B, there begins the cycle of movements which ends in the ejection of the bottom box 62 from the stack. To start this cycle the moving carriage 64 is brought behind the pigeon-hole with its finger 65 within range of the release push-button 44. By means of its finger 65, it is beginning to push in the release push-button 44. In a first step, this causes the cocking push-button 45 to move partially out and the clamping shoe head 53 to move against the last but one box 63 which is then jammed against the resilient lining 55.

In FIG. 9C, the finger 65 of the moving carriage 64 stops pressing the release push-button 44. This, in a second step, causes the cocking push-button 45 to move completely out and the trap-door 31 to open. The bottom box 62 of the stack falls by gravity onto the bottom plate 68 and in front of the push plate (not illustrated) of the moving carriage 64 while the rest of the stack is held in the pigeon-hole by the jamming action of the clamping shoe on the box 63.

In FIG. 9D, the moving carriage 64 moves towards the front of the pigeon-hole, pushing the box 62 in the direction of the front face of the drawer. Its finger 66 comes up from behind the trap-door 31 and closes it.

In FIG. 9E, the moving carriage 64 moves slightly forwards while its finger 66 continues to keep the trap-door 31 closed. Its finger 67 is within reach of the cocking push-button 45 which it pushes in, thereby locking the trap-door 31 in the closed position. The clamping shoe head 53 can then retract out from the pigeon-hole and the release push-button 44 can be fully extended.

In FIG. 9F, the box 63 released by the clamping shoe falls onto the trap-door 31 which is closed and the moving carriage continues its travel towards the front of the drawer, pushing the box 62.

The parts of the ejector mechanism of a pigeon-hole which are housed in a casing 43 and which are used to actuate the trap-door and clamping shoe as in the above-described operation cycle are illustrated in FIGS. 10 to 17. They mainly comprise two sliding triggers, one of which controls the operation of the clamping shoe and the other of which controls the operation of the trap-door. They also include the means for driving, cocking and releasing, controlled by the release push-button 44 and the cocking push-button 45.

Figure 10:
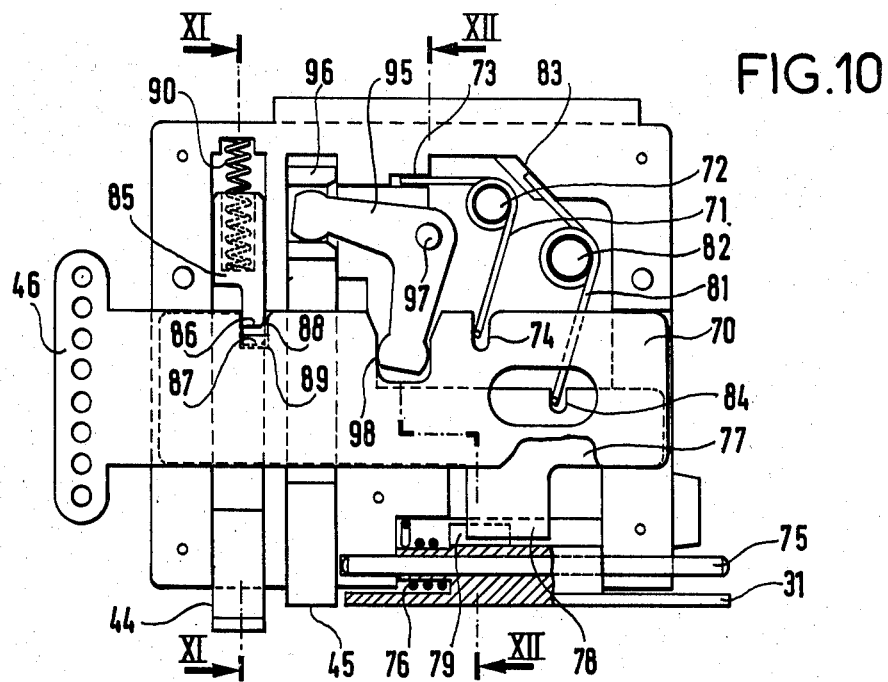
FIG. 10 illustrates a casing with one of its halves removed to show a box extractor mechanism in the rest position.
Figure 13:
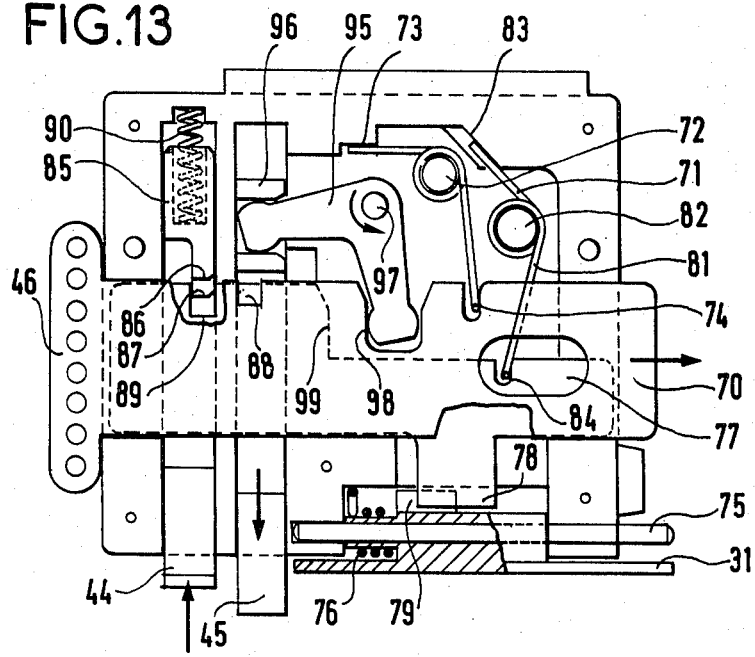
FIG. 13 is a view similar to FIG. 10 showing a box extractor mechanism being released.
Figure 14:
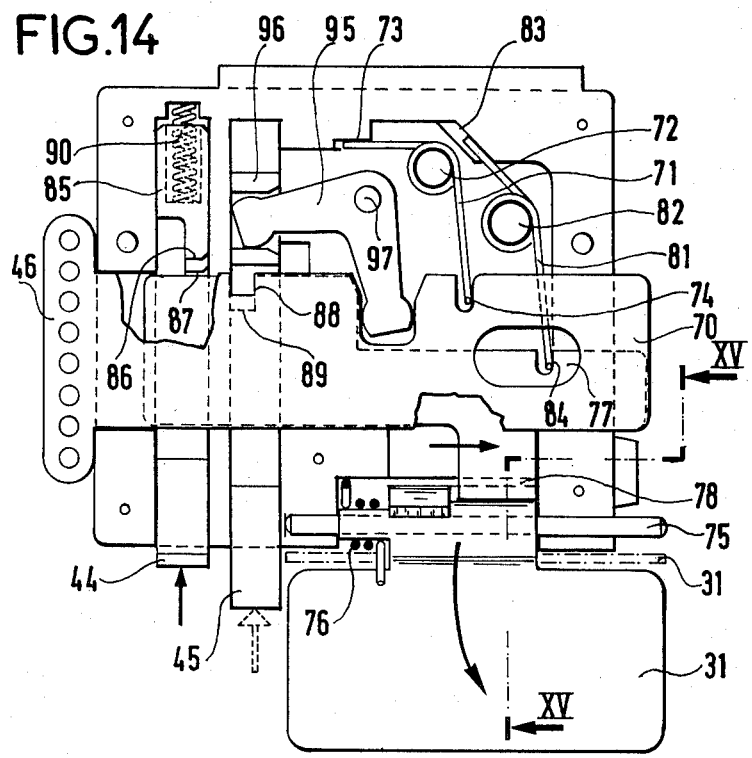
FIG. 14 is a view similar to FIGS. 10 and 11 showing a box extractor mechanism at the end of release.

Each casing 42 has two halves. FIGS. 10, 13 and 14 illustrate an open casing with one of its halves removed, respectively in the rest position with the clamping shoe retracted out of the pigeon-hole and the trap-door closed, in the intermediate release position with the clamping shoe extending into the pigeon-hole and the trap-door still closed and in the final release position with the clamping shoe extending into the pigeon-hole and the trap-door open.

These figures illustrate in the foreground a first trigger 70 in the form of a blade whose head 46 extends outside the casing 42 to actuate the clamping shoe. This first trigger 70 slides horizontally (from left to right in these figures) from a rest position (FIG. 10) where it holds the clamping shoe retracted in its guide part 48 to a working position (see FIGS. 13 and 14) where it causes the clamping shoe head to extend into the pigeon-hole. It is resiliently biased towards its working position by a wound wire torsion spring 71. The torsion spring 71 is installed above the first trigger 70 on a stud 72 which is integral with a half casing. One of the ends of the spring 71 bears on a shoulder 73 situated in a half casing and its other end fits into a notch 74 cut in the upper edge of the first trigger 70.

The trap-door 31 pivots on a horizontal pin 75 fixed to the base of a casing between the two halves thereof. It is resiliently biased towards the open position by a wound wire torsion spring 76 placed around its pin 75. All along its pivot pin 75 and in planes which pass therethrough, it has abutment surfaces 79 and 80 which engage a finger 78 which, when positioned in front of one or other of these surfaces, either prevents the trap-door 31 from pivoting or limits its degree of opening. This finger 78 projects from the lower edge of a second trigger 77 which is clearly illustrated in the background in FIGS. 10, 13 and 14 behind the first trigger 70. This second trigger 77 is also in the form of a blade. It slides horizontally and in the same direction as the first trigger 70 (from left to right in the figures) between a rest position (FIGS. 10 and 13) where its finger 78 is positioned in front of the first abutment surface 79 to lock the trap-door 31 in the closed position, and a working position (FIG. 14) where its finger 79 is positioned in front of the second abutment surface 80 and then limits only the opening angle of the trap-door 31.

Figure 17:
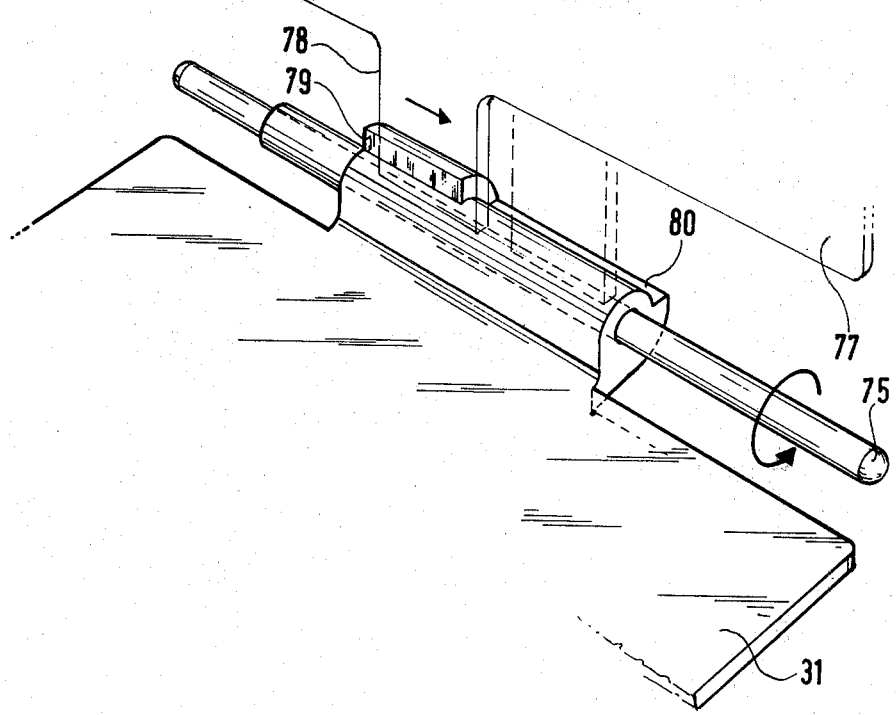
FIG. 17 is a perspective view illustrating a trap-door hinge and showing a mechanism for extracting boxes from a pigeon-hole.

The shapes of these two abutment surfaces 79 and 80, their position on the hinge of the trap-door 31 and their co-operation with the finger 78 of the second trigger appear more clearly in FIG. 17 which is a perspective view of the lower portion of the second trigger 77 and of the trap-door 31 in the neighbourhood of its hinge.

Like the first trigger 70, the second trigger 77 is resiliently biased towards the working position by a torsion spring 81 (FIGS. 10, 13 and 14) made of wound wire. This torsion spring 81 is assembled above the two triggers 70 and 77 on a stud 82 which is integral with a half casing. One of its ends bears on a shoulder 83 situated in a half casing and its other end fits into a notch 84 cut in the upper edge of the second trigger 77.

The two triggers 70 and 77 are held in their rest positions despite the force exerted by the torsion springs 71 and 81 by locking means constituted by a latch 85. The latch slides vertically behind the two triggers 70 and 77. It is provided with two superposed studs 86 and 87 which point downwards, the stud 86 engages in a notch 88 formed in the upper edge of the first trigger 70 and the stud 87 engages in a notch 89 formed in the upper edge of the second trigger 77. The stud 86 is shorter than the stud 87. When the two triggers 70 and 77 are held in their rest positions by the latch 85, the stud 86 engages less deeply in the notch 88 of the first trigger than the stud 87 engages in the notch 89 of the second trigger 77. In this way, the latch first releases the first trigger 70 on unlocking. The latch 85 is resiliently biased downwards by a compression spring 90 which presses against its upper end so as to push its studs 86, 87 against the upper edges of the triggers 70 and 77 and to keep them engaged in the notches 88, 89 when the two triggers 70 and 77 are brought to their rest positions.

The lower end of the latch 85 extends out of the casing in the form of the release push-button 44 which allows it to be actuated by the moving carriage.

The two triggers 70 and 77 are brought from their working positions to their rest positions by pushing them by means of the cocking push-button 45 actuating a bell-crank lever 95 via a vertical pull knob 96. The bell-crank lever 95 is placed above the two triggers 70 and 77 on a pin 97 integral with both halves of the casing. One of its ends bears against vertical shoulders 98, 99 (FIG. 13) cut in the upper edges of the two triggers 70 and 77 and pointing in the direction of the working positions of these triggers. Its other end is articulated by a knee joint on the head of the vertical pull knob 96. It transforms the upward movement of the vertical pull knob 96 into a cocking movement for both the triggers 70 and 77. The vertical pull knob 96 is placed beside the latch 85 behind the two triggers 70 and 77. Its lower end extends inside the casing in the form of the cocking push-button 45 which allows it to be actuated.

Figure 11:
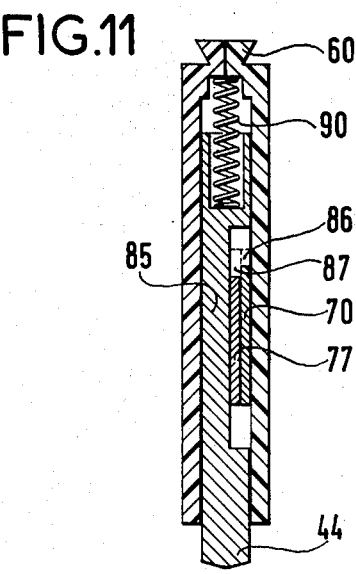
FIG. 11 is a transversal cross-section along line XI—XI of FIG. 10.
Figure 12:
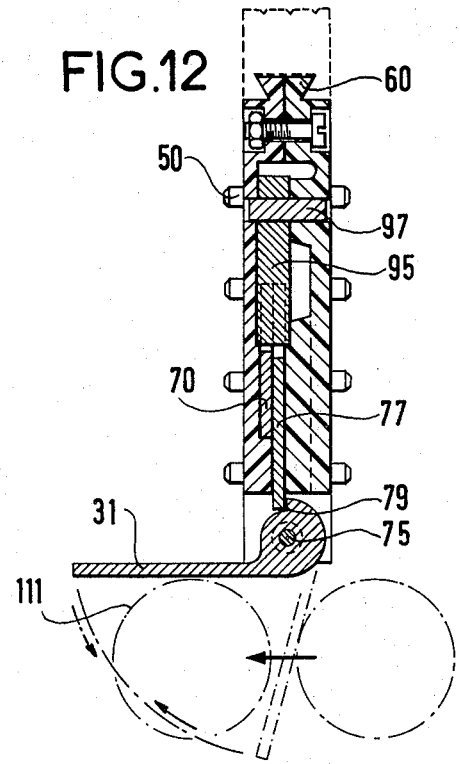
FIG. 12 is a transversal cross-section along the chain-dotted line XII—XII of FIG. 10.

FIG. 11 is a transversal cross-section along line XI—XI of FIG. 10 in the axis of the trigger and FIG. 12 is a transversal cross-section along the chain-dotted line XII—XII. FIG. 11 shows clearly the side-by-side disposition of the two triggers 70 and 77 and the stepped configuration of the two studs 86 and 87 of the latch 85 which allows the mechanism to be released in two steps, with the release of the first trigger 70 moving the clamping shoe before the second trigger 77 is released, thereby releasing the trap-door. FIG. 12 shows clearly the side-by-side disposition of the two triggers 70 and 77 as well as the way in which the finger 78 of the second trigger 77 co-operates with the first abutment surface 79 to keep the trap-door 31 closed.

Figure 15:
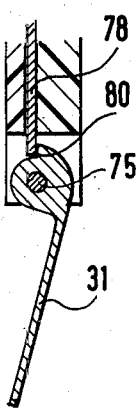
FIG. 15 is a cross-section along the chain-dotted line XV—XV of FIG. 14.

FIG. 14 which illustrates a casing 42 with one of its halves removed and which is in the final release position, while FIG. 15 is a transversal cross-section along a segment of line XV—XV in FIG. 14 which shows the way in which the finger 78 of the second trigger 77 co-operates with the second abutment surface 80 to limit the opening of the trap-door 31.

Figure 16:
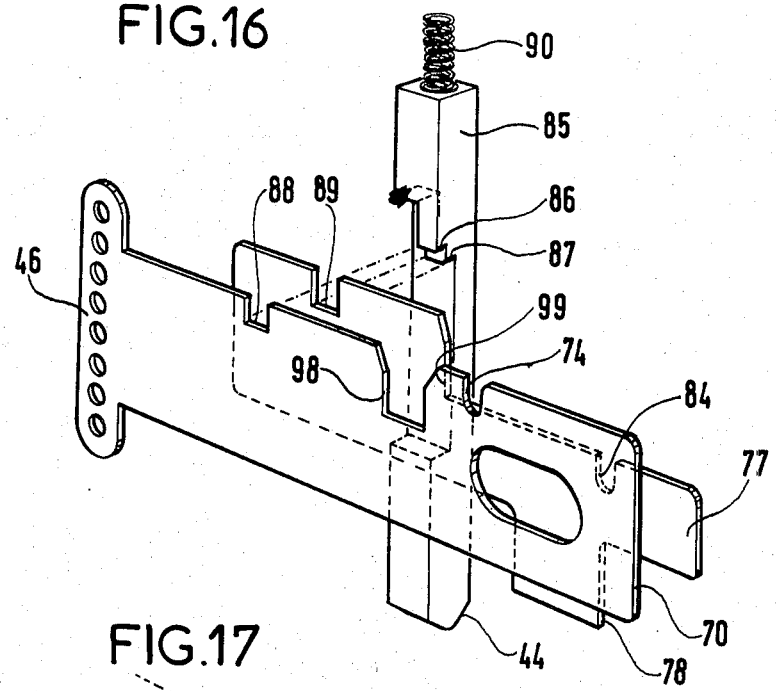
FIG. 16 is a perspective view of the main moving parts of the casing of a box extractor mechanism.

FIG. 16 is an exploded perspective view which shows in detail the shapes of the two triggers 70 and 77 and of the latch 85 and in particular the stepped configuration of the two superposed studs 86, 87 of the latch.

The shapes of the moving carriages which serve the racks of pigeon-holes and the shapes of the means which allow them to actuate the release and cocking buttons of the mechanisms for withdrawing boxes from the pigeon-holes and for closing the trap-doors are shown in FIGS. 18 to 21.

Figure 18:
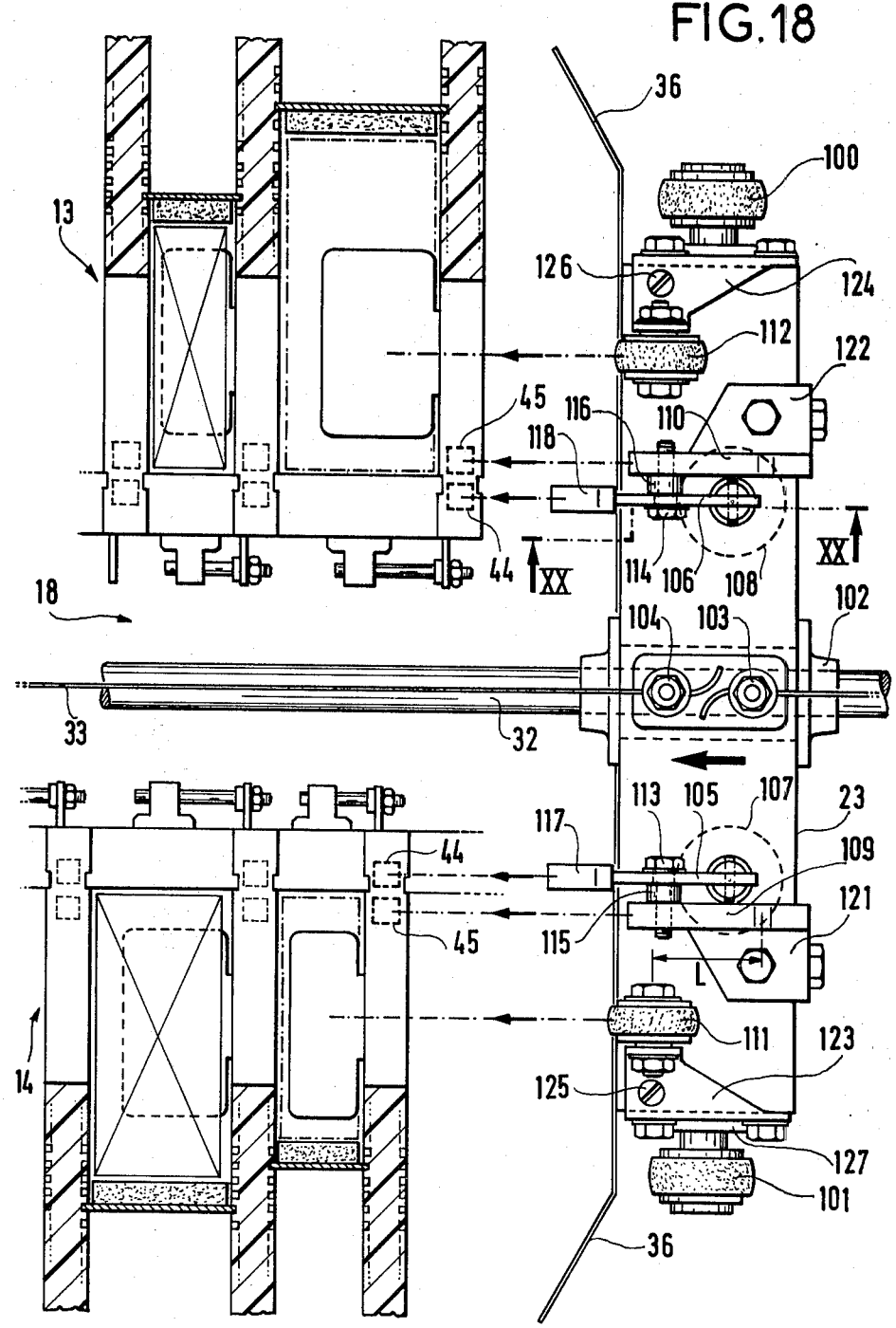
FIG. 18 is a horizontal cross-section of two racks of pigeon-holes of a drawer, illustrating a top view of a moving carriage which serves them.

FIG. 18 is a horizontal cross-section of a group of pigeon-holes of a drawer, e.g. the group referenced 9 in FIG. 2, with its two racks 13, 14 of pigeon-holes. The racks are separated by a passage 18 with parallel walls. The figure is a top view of the moving carriage 23 which serves the pigeon-holes of both groups and which moves parallel to the passage 18 in the space below the pigeon-holes.

The casings 42 of the mechanisms for extracting boxes from the pigeon-holes are aligned with the walls of the passage 18 so that their release buttons 44 and cocking buttons 45 as well as their trap-doors 31 form alignments which are parallel to the direction of the passage 18. The casings of one of the racks 13 of pigeon-holes are mirror images of those of the other rack of pigeon-holes since the trap-doors 31 of both racks must always close in the same direction, towards the front of the drawer, i.e. as shown by the arrows drawn in FIG. 18.

The carriage 23 is wider than it is long. This gives it the appearance of a beam extending in a direction perpendicular to the passage 18. It rests on two side rollers 100 and 101 situated on the bottom of the drawer which contains the pigeon-holes. A ball bearing 102 in which slides a guide rail 32 in the shape of a bar passes through its mid point, said guide rail being fixed in the passage 8 half way between the two racks 13 and 14 of pigeon-holes. It is drawn by a cable 33 which, as seen with reference to FIG. 3, is installed as a drive belt between drive pulleys and driven pulleys disposed at the ends of the guide rail 32, in a vertical plane, the ends of the drive belt being fixed by bolts 103 and 104 to the midpoint of the top of the carriage 23.

The carriage 23 is a two-part carriage fixed on its upper surface, symmetrically about a vertical plane which passes through the guide rail 32 and starting therefrom there are:
two electromagnetic plunger mechanisms each aligned with the release buttons 44 of the casings of the mechanisms for extracting boxes from the pigeon-holes situated on respective sides of the passage 18;

two stationary cams 109, 110 set in a direction parallel to that of the guide rail 32 and each aligned with the cocking buttons 45 of the casings of the mechanisms for extracting boxes from the pigeon-holes situated on respective sides of the passage 18; and two rollers 111, 112 disposed in vertical planes parallel to the guide rail and each in line with the middles of the hinges of the trap-doors 31 of the pigeon-holes on respective sides of the passage 18.

Each electromagnetic plunger mechanism comprises respective lever arms 105, 106 which pivot in the vertical plane about respective stationary intermediate pins 113, 114 fixed in the side wall of respective stationary cams 109, 110. Each lever arm is aligned with the casing release buttons 44 by means of a spacer washer 115, 116 installed on its stationary pin 113, 114, between it and the stationary cam 109, 110 which supports it. One of its ends pivots on the plunger core of an electromagnet 107, 108. Its other end is free and ends in a shoe 117, 118 which extends beyond the front of the carriage in an overhanging position so as to be able to actuate the release button 44 of a casing without the carriage blocking the release passages beneath the trap-door 31 controlled by the casing in question.

FIG. 20 is a cross-section side view along line XX—XX of FIG. 18 showing in detail the play of one, 118, of these shoes in the vertical plane relative to the casing release buttons 44, as well as its profile, and those of the lever arm 106 to which it belongs and of the electromagnet 108 which operates it. When the plunger mechanism is at rest, i.e. when its electromagnet 108 is not energized its shoe 118 is lowered and does not come into contact with the release buttons 44. When it is working, its electromagnet 108 is energized and its shoe 118 is raised (position illustrated in broken lines in FIG. 20) and lightly touches the bottoms of the casings. The curved profile of the shoe 118 avoids the necessity of very precise positioning of the carriage 23 since energizing the electromagnet which controls the plunger mechanism can occur while the shoe is approaching close to the release button 44 of the chosen pigeon-hole, the release button 44 subsequently being fully pressed home by a movement of the carriage.

The electromagnets 107, 108 of the carriage are controlled from the drawer by a system of conductor rails and of collector shoes, not illustrated.

The staionary cams 109, 110 are fixed on the carriage 23 by means of brackets 121, 122 which are bolted on both the upper surface and the back surface of the carriage. They are disposed in line with the cocking buttons 45 of the casings and, as shown more clearly in FIG. 20, their profile is shaped like an inverted V with apexes which lightly touch the bases of the casings 42. By means of these cams, the cocking buttons 45 of the casings 42 are pushed home simply by advancing the carriage 23 in the direction of the front face of the drawer.

The two rollers 111 and 112 are designed to close the trap-doors before the cocking buttons 45 are actuated by means of the stationary cams 109, 110. They are installed on the top of the carriage in vertical planes parallel to the guide rail 32 and which pass through the middles of the trap-doors 31. They lightly touch the bases of the casings and are displaced towards the front of the carriage 23 relative to the axes of the cams 109, 110 by a distance L which is slightly less than the width of the smallest trap-door to be closed. Their axle pins are fixed to the top of the carriage by feet 123, 124 which are bolted to the side walls of the carriage and which can be adjusted for height by screws 125, 126.

Two push plates 36 are fixed to the front of the carriage 23 and enable the carriage to push forwards any boxes which fall from the pigeon-holes towards the front of the drawer.

FIG. 19 is a side view of a carriage and illustrates in particular detail the support 123 of a roller 111 which serves to close the trap-doors 31 as well as the support 127 of a side roller 101 by which the carriage bears against the bottom plate 68 of the drawer, both supports being adjustable for height.

FIGS. 21A–21C very schematically illustrate the controlling of a carriage and the various positions it assumes relative to the mechanism for extracting boxes from a pigeon-hole when it actuates then cocks the pigeon-hole.

As seen with reference to FIG. 2, the assembly constituted by all the moving carriages in a drawer is driven in synchronism by a single motor 25. This motor is a step by step motor or a motor equipped with an angular position coder by which the positions of the carriages along the racks can be detected at any time. Like the electromagnets of the plunger mechanisms, it is controlled by a computer 130 which also controls the inventory and is provided with input and output peripheral equipment such as a printer 131 and a console 312 with a keyboard and a display screen.

In FIGS. 21A, 21B and 21C, there may be distinguished:

- a pigeon-hole of which a cross-section is shown with its side walls 20;
- a stack 30 of boxes disposed in the pigeon-hole with its two lower boxes referenced 62 and 63;
- the trap-door 31 disposed beneath the stack 30;
- the casing 42 which contains the drive parts for the trap-door 31 with the release push-buttons 44 and the cocking push-buttons 45 whose disposition has been modified to make the figure easier to understand;
- the moving carriage schematically illustrated by a rectangle 23 which rests on the bottom plate 68 of the drawer by means of its roller 101 and which is topped by the stationary cam 109, the roller 111 for closing the trap-door and the release shoe 117;
- the bottom plate 68 of the drawer; and
- the push plate 36 placed on the front face of the carriage.

FIG. 21A shows the beginning of the cycle of movements which leads to the extraction of a box from the stack 20. The carriage 23 is positioned by the computer 130 so as to put the shoe 117 within reach of the release push-button 44.

In FIG. 21B the computer 130 controls the energization of the electromagnet which operates the shoe 117 while this shoe is still within reach of the release push-button 44. The shoe 117 pushes the release push-button 44 in and this, as set forth relative to parts B and C of FIG. 9, firstly causes the cocking button 45 to return partially and the last but one box 63 in the stack 30 to be jammed, and then secondly causes the cocking push-button 45 to return completely, the trap-door to open and the bottom box 62 of the stack 30 to fall in front of the carriage which remains behind the pigeon-hole.

In FIG. 21C the computer 130 cuts off the energization of the electromagnet which operates the shoe 117 and controls the advance of the carriage 23 in the direction of the front of the drawer 3.

During this advance the roller 111 comes into contact with the underside of the trap-door 31 which it closes then the stationary cam 109 presses on the cocking push-button 45. As set forth with reference to FIG. 9, this locks the trap-door 31 in the closed position, unjams the last but one box 63 of the stack 30 which box falls onto the trap-door and makes the cocking push-button 44 return. Simultaneously, the carriage 23 pushes the box 62 towards the front of the drawer.

Several boxes can be extracted from different pigeon-holes during a single run of the carriages along the pigeon-holes. In the case where several boxes are to be extracted from the same pigeon-hole the computer is programmed to make short returns of the carriages backwards to allow the position to be changed from that in FIG. 21C to that illustrated in FIG. 21A.

FIGS. 22 to 24 illustrate a variant of the clamping shoe and of its guide part.

In this variant, the guide part is in the form of a vertical rectangular frame 150 which fits between the sides of two adjacent casings 170 and in front of the base of a pigeon-hole, its side surfaces coming into contact with the casings 170 each of which has a longitudinal groove 151 in which studs (50, FIG. 4) fit or a vertical flange 152 which stands out in relief relative to the sides of the casings 170. It can slide vertically between the sides of the casings 170 to allow the height of the shoe opposite the last but one box from the bottom of the stack in the pigeon-hole to be adjusted and the shoe to be locked in position by means of a slightly larger horizontal collar 153 which is screwed on its upper rim on the outer side relative to the pigeon-hole and which bears on either side on the end surfaces of the casings 170. On the ends of its lower rim, on the outer side relative to the pigeon-hole, it has two vertical tabs 154 in which are fixed the ends of a first horizontal spring bearing bar 155. A retainer bar 156 is placed horizontally across the opening of the frame and fixed in the vertical rims thereof.

The clamping shoe has a flat rectangular head 157 which fits with play into the opening of the frame. This head extends towards the outside of the pigeon-hole in the form of a body of the same width which body has a horizontal slot 158 in which the retainer bar 156 slides. The body ends on the furthest side from the head 157 by two laterally disposed vertical tabs 159 which support a second horizontal spring bearing bar 160 which extends assymetrically beyond one side of the frame when the shoe is in position therein and intercepts a trigger head 161 which emerges from the end surface of one of the casings 170 which surround the pigeon-hole in question.

The middle portion of a coiled wire spring 162 is fitted on the second bearing bar 160 which is integral with the shoe and its ends are fitted on the first bearing bar 155 which is integral with the frame. It is installed twisted. This tends to make the shoe head enter the pigeon-hole and supplies the necessary thrust to block the last but one box of the pushed stack which box no longer has to be delivered by the mechanism of the casing. During the rest period, the clamping shoe is prevented from entering the pigeon-hole by the thrust exerted by the spring 162 on the end of the second bearing bar 160. It is not necessary to provide for the trigger head 161 to be fixed to the clamping shoe and this avoids any installing operation after the height of its guide part has been adjusted relative to the pigeon-hole, the assembly constituted by the clamping shoe, its guide part and the wound wire spring being pre-assembled on manufacture.

FIGS. 24 and 25 illustrate a variant of embodiment of the casings which contain the object extractor mechanism. A side view of this variant is shown in FIG. 24 and a front view thereof with one of the halves of the casing removed is shown with the mechanism in the rest position in FIG. 25.

In this variant, the mechanism of the casing includes a single trigger 165 which controls simultaneously the trap-door and the clamping shoe. This single trigger 165 is clearly shown in the foreground of FIG. 24 inside the half casing 166. It is in the form of a blade which extends outside the end surface of the casing in the form of a head 161 which actuates the clamping shoe and whose base has a finger 168 which controls the trap-door 180. It slides horizontally (from right to left in FIG. 25) from a rest position in which it is illustrated and where it keeps the trap-door 180 closed and the clamping shoe retracted, to a working position in which it makes the shoe clamp and releases the trap-door 180.

The single trigger 165 is resiliently biased towards its working position by a coiled wire compression spring 168 which is installed in a horizontal rectangular opening 169 cut in the middle portion of the trigger 165 to fit the dimensions of the spring. It presses against the right-hand edge of the trigger 165 by the right-hand edge of the opening 169 on which it is held by a stud 170 and on bearing surfaces formed facing it in the half casings in front of the left-hand edge of the opening 169.

Despite the force exerted by the compression spring 168 the single trigger 165 is held in its rest position by a locking means constituted by a latch 171 which slides vertically behind the trigger 165. This latch 171 has a stud 172 which is turned downwards and engages in a notch 173 formed in the upper edge of the trigger 165 and is constantly urged downwards by a compression spring 173 which presses on its upper end. The lower end of the latch 171 is prolonged by a release button 174 which allows it to be actuated.

The single trigger 166 is returned from its working position to its rest position by pushing it back by means of a cocking push-button 175 worked by a bellcrank lever 176 which pivots above the trigger 165 on a pin 177 which is integral with the half casings. One end of the bellcrank lever 176 is pressed into a notch 179 formed in the upper edge of the trigger 165. Its other end is articulated by a knee joint at the head of a vertical pull knop 177 which prolongs the cocking push-button 175.

Trap-door 180 is hinged on a horizontal pin 181 fixed to the base of the casing and between the two halves thereof. It is resiliently biased to the open position by a coiled wire torsion spring 182 placed around one end of its pin 181. Along its pivot pin 181 and in a plane which passes therethrough, it has abutment surfaces 183, 184 disposed symmetrically relative to its middle plane whose cross-section is orthogonal to the pivot pin 181 which allow the finger 168 of the trigger 165 to lock the articulation of the trap-door or to release it, placing it in front of one of the two surfaces or between them. Only one of the abutment surfaces 183, 184 is used. With the abutment surfaces 183, 184 and their symmetrical disposition, it does not matter which way the trap-door 180 is assembled relative to the casing 170, it being optional also towards which side the trap-door closes. The under surface of the trap-door 180 has a middle ridge 185 perpendicular to the pivot pin 181 and bevelled at its ends. This ridge 185 serves as a roll path for the roller of the moving carriage which closes the trap-door 180 while the cocking button 175 is actuated. It also serves to make the trap-door 180 rigid.

The release push-button 174 and cocking push-button 175 are spaced out along the lower end surface of the casing on either side of the pivot pin of the trap-door 180. This allows greater freedom for positioning their actuating means on the moving carriage.

The casing which has just been described with reference to FIGS. 24 and 25 can be used with both systems of clamping shoe described previously but it is used preferably with that illustrated in FIGS. 22 and 23.

In the case of the clamping shoe system described with reference to FIGS. 4 to 8, the head 161 of the single trigger 165 has a vertical set of holes analogous to that provided in the head of the first trigger of the casing illustrated in FIG. 10. The last but one box from the bottom of the stack in the pigeon-hole is jammed by a movement of the clamping shoe which movement is constant and in the direction of the resilient lining (55, FIG. 4) of the opposite wall due merely to the action of a compression spring (168, FIG. 25) which actuates the trigger 165 and which must be tared accordingly. The amplitude of this movement corresponds to that of the movement which the dog 168 of the trigger must make to escape from one of the two abutment surfaces 183, 184 of the trap-door 180.

In the case of the clamping shoe system described with reference to FIGS. 22 and 23 the head 161 of the single trigger 165 comes into contact with the second bearing bar 160 which is integral with the clamping shoe but is not fixed to it, this making the stroke of the trigger 166 independent from that of the clamping shoe. The clamping force of the shoe is due exclusively to the coiled wire spring 162 fitted on the bearing bars 155 and 160.

The casing which has just been described with reference to FIGS. 24 and 25 can be actuated by means of a moving carriage analogous to that illustrated in FIG. 18, the cam 108 being used to depress the cocking push-buttons of the casings and the electromagnetic plunger mechanism being used to depress the relese push-buttons of the casings being positioned laterally to be aligned with these buttons. The various operation steps of the casing and the relative positions of the carriage when an object is extracted from the pigeon-hole controlled by the casing are then as those described with reference to FIGS. 9 and 21.

Figure 26:
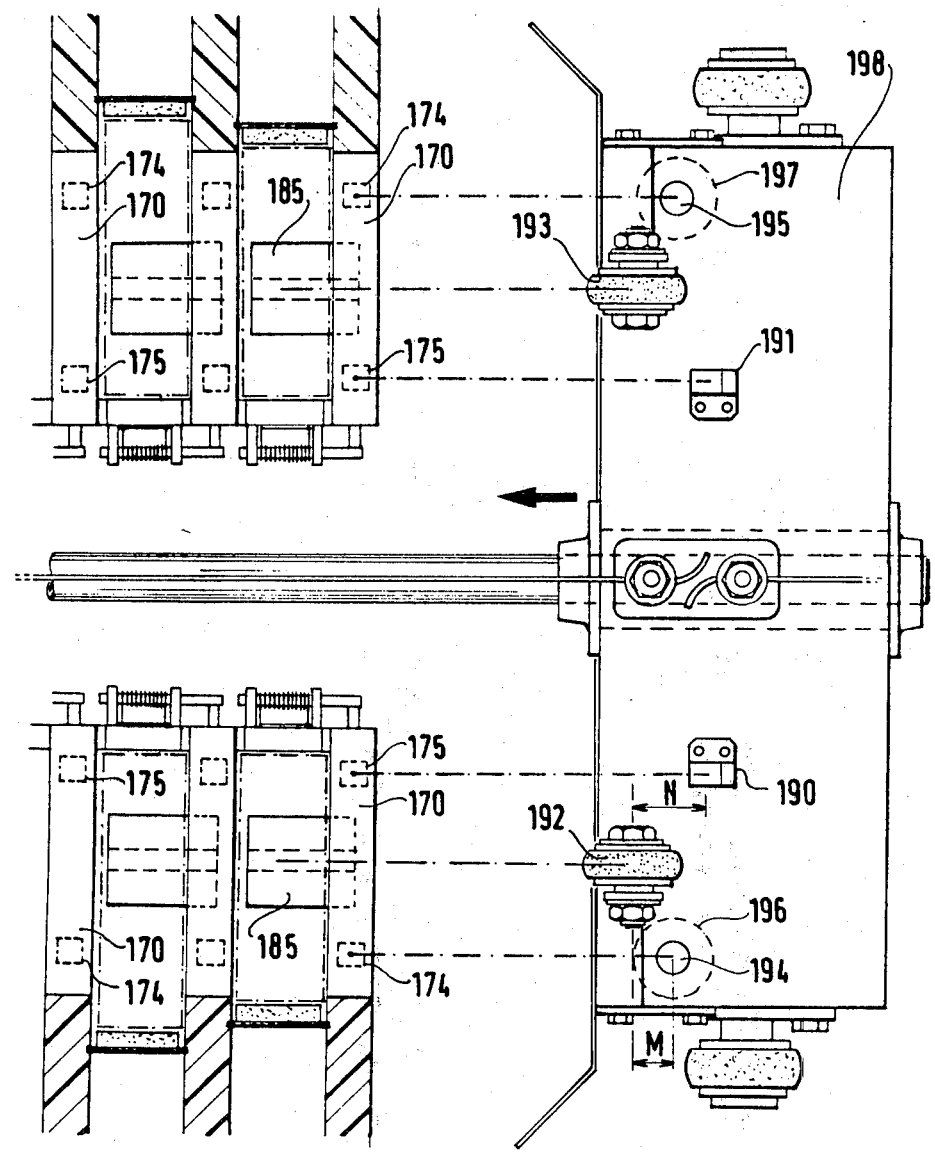
FIG. 26 is a horizontal cross-section of two racks of pigeon-holes of a drawer and illustrates a moving carriage, seen from above, which carriage serves the racks.

FIG. 26 is a horizontal cross-section of two racks of pigeon-holes of a drawer. This figure illustrates a moving carriage seen from above and serving these racks. The drawer is designed to slightly raise the trap-door of a casing when it actuates or cocks the mechanism thereof so that there is no friction between the abutment surfaces of the trap-door and the finger of the trigger of the actuating mechanism.

FIG. 26 shows clearly the casings 170 described with reference to FIGS. 24 and 25 disposed perpendiculary to the walls of a passage so that their release buttons 174 and cocking buttons 175 form alignments parallel to the direction of the passage. Casings 170 of one of the racks are disposed symmetrically respective to that of the other of the racks, their trap-doors all closing in the same direction towards the front of the drawer whence the advantage of being able to assemble the trap-door with an optical closing direction.

A carriage 198 in the form of a beam perpendicular to the passage moves in the middle of this passage in the space beneath the pigeon-hole due to the same rolling and guide means as those of the carriage illustrated in FIG. 18. Again its front is equipped with two push blades and its upper surface is equipped with:

two electromagnetic plunger mechanisms placed in line with the release buttons 174 of the casings of the two racks;

two stationary cams 190, 191 parallel to the direction of the passage, said cams being placed in line with the cocking buttons 175 of the casings of both racks; and two rollers 192, 193 placed in line with the mid planes of the trap-doors and, more precisely, in line with the middle ridges 185 of the trap-doors.

The rollers 192, 193 are placed at the front of the carriage, the front being determined relative to the direction of the arrow.

The electromagnetic plunger mechanisms no longer have any lever arms installed but use simple buttons 194, 195 fixed on the ends of the plunger cores of electromagnets 196, 197. Relative to the rollers 192, 193 they are set back by a distance M which is such that the buttons 194, 195 come in line with the release buttons 176 of the casings 170 when the rollers 192, 194 roll on the non-bevelled half (186, FIG. 24) and near the casing in question from the middle ridge 185 of the articulated trap-door 180 to the casing in question.

The stationary cams 190, 191 have only one slope directed towards the front of the carriage and their width is about the same as of the non-bevelled half of the middle ridge 185 of the smallest trap-door 180. Relative to the buttons 194 and 195 of the electromagnetic plungers they are set back by a distance of N relative to the rollers 192, 193 which distance is such that they engage with the cocking buttons 175 of the casings 170 when the rollers reach the non-bevelled half (187, FIG. 24) which is the furthest from the casing in question, from the middle ridge 185 of the articulated trap-door 80 to the casing in question.

With a trap-door whose minimum width is 5 cm pivoting on a pin which is set back by 0.5 cm and fitted with a middle ridge which is bevelled along 1 cm at its ends, the set back distance M may be 1.25 cm, the set back distance N may be 2.75 cm and the length of the stationary cams 190, 191 may be 1.5 cm.

The carriage which has just been described opens the trap-doors during one movement and closes them during a return movement. Its rest position is at the front of the drawer, all the trap-doors being closed.

To open one or several trap-doors of the racks of pigeon-holes the carriage is made to move from the front right to the back of the drawer. When it passes under a casing, its roller 192 or 193 comes into contact with the closed trap-door 180 even before the button 194 or 195 of the plunger or the stationary cam 190 or 191 comes opposite the release buttons 174 and cocking buttons 175. The roller 192 or 193 slightly lifts the trap-door 180 and relieves the finger of the trigger of the mechanism in the casing from the effort which the trap-door 180 exerted on it via one of the abutment surfaces 183 or 184. When the roller reaches the non-bevelled portion of the ridge 185 of the trap-door 180, the stationary cam 190 or 191 passes level with the casing, under the cocking button 175 which, in the cases mentioned, is out of reach and in the depressed position. The button 194 or 195 of the plunger then comes level with the casing, beneath the release button 174 whereas the roller comes off the non-bevelled portion of the ridge 185 of the trap-door 180 and the stationary cam 190 or 191 goes beyond the end surface of the casing and clears the operation space of the cocking button 175. The plunger is released at this instant if it is required to open the trap-door operated by the mechanism of the casing in question. The carriage can be momentarily stopped during this release. Due to the action of the plunger mechanism and of the release button 174 the trigger 165 of the mechanism of the casing passes to its working position where it actuates the clamping shoe and unlocks the articulation of the trap-door 180 which is kept closed by the roller 190 or 191 of the carriage as long as the carriage has not cleared the space beneath the trap-door by moving towards the back. On its return the carriage closes any trap-doors 180 which are open by means of its rollers 190 and 191 cocks the mechanisms of the casings by means of its stationary cams 190 and 191 and pushes the boxes which have been extracted from the pigeon-holes towards the front of the drawer.

With this type of actuation which prevents friction of the finger of the trigger against the abutment surfaces of the trap-door when the trigger is operated, wear is reduced and consequently the service life of the casings is longer.

Another advantage of this type of operation is the automatic recentring of the boxes within their stacks due to the fact that the trap-doors are slightly lifted during an outgoing pass of the carriage.

Without going beyond the scope of the invention, some dispositions can be modified or some means can be replaced by equivalent means. In particular, the design of the carriages can be modified so that they each serve only rack or, even, they can be combined together in a single part. Also, passages need not be provided between the racks.

I claim:

1. Automatic resetting apparatus for storing and dispensing objects, said apparatus comprising:
   means including a side wall defining vertical piegonholes for storing stacks of objects, said pigeonholes including a horizontal hinged trap-door defining a bottom of each pigeon-hole, said pigeonholes being disposed in at least one horizontal row and forming a rack;
   one ejector mechanism per pigeon-hole, said ejector mechanism being housed in a flat body or casing which fits vertically into a cut-out portion at the lower part of said side wall of the pigeon-hole and being operatively positioned with respect to said trap-door and designed to close the bottom of the pigeon-hole and to support the stack of objects contained in the pigeon-hole, and a clamping shoe carried by said ejector mechanism which allows the last but one object of the stack to be jammed against a side wall of the pigeon-hole during the opening of the trap-door;
   one moving carriage per rack of pigeon-holes which carriages moves along the rack;
   guide and drive means for each moving carriage;
   first means on said carriage for selectively operating said ejector mechanisms to jam the clamping shoe against said last but one object and then open said trap-door;
   second means on said carriage for automatically resetting the ejector mechanism previously selectively operated to close said trap-door and release said clamping shoe, in that order, after dispensing of the last object of the stack in response to continued movement of said carriage;
   motor means for engaging said drive means for moving said carriage; and
   means for collecting the objects removed from the pigeon-holes.

2. Apparatus according to claim 1, wherein the means for collecting the objects removed from the pigeon-holes include a release passage beneath each rack of pigeon-holes which communicates with a trough outside the apparatus.

3. Apparatus according to claim 2, wherein the collecting means further include for each rack of pigeon-holes a push plate which is fixed to the moving carriage serving the rack and which moves along the release passage.

4. Apparatus according to claim 1, wherein the pigeon-holes are divided into groups of two parallel racks of substantially equal length and which are separated by a passage beneath which move the two moving carriages which serve them and which are combined in a single moving part.

5. Apparatus according to claim 1, wherein the trap-door which closes the bottom of each pigeon-hole is articulated at the base of the casing of the ejector mechanism.

6. Apparatus according to claim 1, wherein each ejector mechanism includes a first sliding trigger and a second sliding trigger housed side by side in a casing, the first trigger controlling the operation of the clamping shoe and the second trigger controlling the opening of the trap-door.

7. Apparatus according to claim 6, wherein each ejector mechanism further includes:
   resilient means biassing the first trigger towards a working position in which it faces the clamping shoe to extend into the pigeon-hole with which the extractor mechanism is associated and biassing the second trigger towards a working position in which it releases the trap-door;
   cocking means opposing the action of the resilient means thereby allowing the first trigger to be brought from its working position to a rest position in which it retracts the clamping shoe and allows the second trigger to be brought from its working position to a rest position in which it prevents the trap-door from opening; and
   locking means for holding the first trigger and the second trigger in their rest positions when they have been brought thereto by the cocking means and for release successively beginning with the first trigger.

8. Apparatus according to claim 6, wherein the locking means include:
   a latch which slides in the casing to engage the triggers and being provided with two studs, one engaging a notch forming in the first trigger and the other engaging a notch formed in the second trigger when said triggers are in their rest positions, the stud engaging the notch in the second trigger entering the notch more deeply than the other so that the first trigger is released first when the locking means unlock; and
   a compression spring pushing the latch back to urge its studs back against the triggers and to keep said studs engaged with the notches of said triggers when said triggers are in their rest positions.

9. Apparatus according to claim 8, wherein the first actuating means include a push-button which prolongs the latch on the outside of the casing of each extractor mechanism and which, by pushing the latch back, allows its studs to be pushed back away from the notches of the triggers and the triggers to be released.

10. Apparatus according to claim 9, wherein the second actuating means on a moving carriage include an electromagnetic plunger mechanism disposed on a carriage so as to come adjacent to the push-button which prolongs the latch of the extractor mechanism of a pigeon-hole without the carriage or its components coming into the release passage situated beneath the trap-door of the pigeon-hole.

11. Apparatus according to claim 7, wherein the two triggers disposed in the casing slide parallel to each other and in the same direction to go from their working positions to their rest positions or vice-versa.

12. Apparatus according to claim 11, wherein the cocking means include:
a bellcrank lever pivoting on a stationary pin integral with the casing and having one end bearing against the shoulders formed on the triggers, the shoulders being orientated in the directions of the working positions of said triggers and the lever having its other end bearing against a pull knob; and
means for mounting said pull knob for sliding perpendicularly to the triggers.

13. Apparatus according to claim 12, wherein the first actuating means include a push-button which prolongs the free end of the pull knob on the outside of the casing and, by pushing it back, allows a force which opposes that of the resilient means to be exerted on the triggers via the pull knob and the bellcrank lever so as to return said triggers to their rest positions.

14. Apparatus according to claim 13, wherein the second actuating means on a moving carriage include a stationary cam which, during the movement of the carriage, intercepts the push-button extending the pull knob and pushes it back inside the casing.

15. Apparatus according to claim 5, wherein the second actuating means on a moving carriage include at least one roller which, during the movement of the carriage, closes the trap-door and holds it in the closed position when the cam intercepts the push-button which prolongs the pull knob.

16. Apparatus according to claim 5, in which the trap-door is hinged on the casing by means of a horizontal pivot pin and in which the two triggers slide parallel to this pin in the casing and in the same direction to pass from their working positions to their rest positions, wherein the trap-door has two abutment surfaces in the neighbourhood of its pivot pin comprising a closing abutment surface and an opening abutment surface, and wherein abutment surfaces cooperate with said finger to prevent the trap-door from opening when the second trigger is in the rest position and to limit this opening when the second trigger is in the working position.

17. Apparatus according to claim 1, wherein the clamping shoe slides in a guide part which forms a distance piece placed between the lower portions of the sides of a pigeon-hole against the casing of the extractor mechanism associated with the casing in question.

18. Apparatus according to claim 17, wherein the first trigger extends out of the casing of the extractor mechanism in the form of a head, slides parallel to the clamping shoe and is mechanically fixed thereto by a pin disposed at right-angles to it and bolted in its head.

19. Apparatus according to claim 17, wherein the guide part is fitted between the lower portions of the sides of a pigeon-hole which sides are constituted by the casings of two extractor mechanisms, the surfaces of a casing of a extractor mechanism and the adjacent portions of a guide part having complementary fitting surfaces in a vertical direction allowing the height of the guide part to be adjusted in small increments.

20. Apparatus according to claim 19, wherein said complementary fitting surfaces include:
a vertical groove and a set of studs uniformly spaced out in a vertical line on the side of a casing of an extractor mechanism; and
on each side of the guide part which comes adjacent to a casing of an extractor mechanism, a vertical flange whose cross-section is complementary to that of the groove and holes of the same diameter as the studs uniformly spaced out in a vertical line at a pitch which is a sub-multiple of that which separates the studs.

21. Apparatus according to claim 1, wherein each vertical pigeon-hole of a row further comprising detachable vertical partitions fixed end on with an adjustable spacing onto a vertical dorsal support plate.

22. Apparatus according to claim 21, wherein the pigeon-holes side wall is fixed between the partitions in front of the vertical dorsal plate at an adjustable distance therefrom.

23. Apparatus according to claim 1, wherein the surface of the side wall of a pigeon-hole which is opposite the clamping shoe is resiliently deformable.

24. Apparatus according to claim 23, wherein the portion of the side wall of a pigeon-hole which is opposite the clamping shoe is lined with a resilient lining.

25. Apparatus according to claim 1, wherein the pigeon-holes are formed by several parallel racks of substantially equal lengths served by carriages which are mechanically integral with one another and move in a passage which is below the pigeon-holes and is constituted by the combination of the release passages.

26. Apparatus according to claim 1, wherein the trap-doors are hinged at the bases of the casings of the ejector mechanisms and wherein the clamping shoes are disposed laterally between the sides of two consecutive casings and wherein the ejector mechanism includes:
a trigger sliding laterally in a casing between a rest position and a working position, the direction of its movement from the rest position to the working position coinciding with the direction in which the clamping shoe enters the pigeon-hole with which the extractor mechanism is associated, the trigger having firstly a head which extends laterally beyond the end surface of the casing on the clamping shoe side and operating the clamping shoe and secondly a dog which points towards the base of the casing in the direction of the hinge of the trap-door, said dog, when in the rest position, operatively engaging an abutment surface of the trap-door to lock the trap-door in the closed position and escaping from said abutment surface in the working position to release the trap-door from its closed position;
a resilient means for constantly urging the trigger towards the working position;
a cocking means operable from the outside of the casing opposing the action of the resilient means to allow the trigger to be brought to its rest position, and
a release means for holding the trigger in its rest position when it has been brought there by the cocking means and releasable from the outside of the casing.

27. Apparatus according to claim 1, in which the clamping shoes slide in guide parts in the direction of the pigeon-holes, wherein the clamping shoes are resiliently urged in the direction of the pigeon-holes by springs and press between the pigeon-holes and the guide parts.

28. Apparatus according to claim 1, in which the trap-doors are mounted to the bases of the casings by pivot pins, said trap-doors having middle ridges on their under surfaces, said ridges being perpendicular to their pins and being bevelled at both ends.

29. Apparatus according to claim 26, wherein at each end, each trap-door has two abutment surfaces disposed in the same plane, the finger of the trigger of the extractor mechanism of the casing on which the trap-door in question is hinged and co-operating equally well with both of the abutment surfaces depending on the direction in which the trap-door is assembled relative to the casing.

30. Apparatus according to claim 1, wherein the second actuating means includes at least one roller mounted on the carriage, said roller being positioned so as to keep the trap-doors closed and to lift them slightly when the first ejector mechanism actuation means are within reach of the carriage.

* * * * *